United States Patent
Joo et al.

(10) Patent No.: US 10,110,135 B2
(45) Date of Patent: Oct. 23, 2018

(54) ELECTROMAGNETIC INDUCTION DEVICE, AND POWER SUPPLY APPARATUS AND DISPLAY APPARATUS HAVING THE SAME

(71) Applicant: SAMSUNG ELECTRONICS CO., LTD., Suwon-si, Gyeonggi-do (KR)

(72) Inventors: Sung-yong Joo, Yongin-si (KR); Jin-hyung Lee, Anyang-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 65 days.

(21) Appl. No.: 15/149,329

(22) Filed: May 9, 2016

(65) Prior Publication Data

US 2017/0025960 A1    Jan. 26, 2017

(30) Foreign Application Priority Data

Jul. 21, 2015  (KR) .......................... 10-2015-0103237

(51) Int. Cl.
*H02M 3/335* (2006.01)
*H01F 27/22* (2006.01)
(Continued)

(52) U.S. Cl.
CPC ...... *H02M 3/33523* (2013.01); *G09G 3/2092* (2013.01); *H01F 27/08* (2013.01);
(Continued)

(58) Field of Classification Search
CPC .. G09G 3/2092; H02M 3/33523; H01F 27/08; H01F 27/22
See application file for complete search history.

(56) References Cited

U.S. PATENT DOCUMENTS

| 4,873,757 A | 10/1989 | Williams |
| 2004/0264980 A1 | 12/2004 | Baek et al. |

(Continued)

FOREIGN PATENT DOCUMENTS

| JP | 2007-059839 | 3/2007 |
| JP | 2008-300734 | 12/2008 |

(Continued)

OTHER PUBLICATIONS

Extended Search Report dated Jan. 2, 2017 in counterpart European Application No. 16168490.7.

*Primary Examiner* — Ricardo L Osorio
(74) *Attorney, Agent, or Firm* — Nixon & Vanderhye P.C.

(57) ABSTRACT

An electromagnetic induction device, and a power supply apparatus and a display apparatus having the same are disclosed, the electromagnetic induction device comprising: a substrate layer comprising at least one substrate configured to be laid one upon another and a thin-film coil pattern, which is formed on at least one of both surfaces of the substrate and through which an electric current of a signal flows, the at least one substrate having an opening provided at an inner area of the thin-film coil pattern; a core configured to have a shape corresponding to a circulation path of magnetic flux generated by change in an electric current flowing in the thin-film coil pattern, and arranged to penetrate the inner area of the thin-film coil pattern through the opening of the substrate layer; and a heat dissipation layer disposed on one surface of the substrate, the heat dissipation layer configured to dissipate heat from at least one of the substrate layer and the core.
The disclosed configuration addresses the problem of heat dissipation in a thin flat-plate structure.

20 Claims, 34 Drawing Sheets

(51) Int. Cl.
    *H01F 27/28*   (2006.01)
    *G09G 3/20*    (2006.01)
    *H01F 27/08*   (2006.01)

(52) U.S. Cl.
    CPC ......... *H01F 27/22* (2013.01); *H01F 27/2804*
        (2013.01); *G09G 2330/02* (2013.01); *H01F*
                                    *2027/2819* (2013.01)

(56) References Cited

U.S. PATENT DOCUMENTS

| | | | |
|---|---|---|---|
| 2006/0289995 A1* | 12/2006 | Talalaevski | B81C 1/00301 |
| | | | 257/758 |
| 2007/0205855 A1* | 9/2007 | Hashimoto | H01F 5/003 |
| | | | 336/200 |
| 2014/0002113 A1 | 1/2014 | Schediwy et al. | |
| 2014/0369006 A1 | 12/2014 | Williams | |
| 2015/0060898 A1 | 3/2015 | Van Heerden et al. | |
| 2015/0101855 A1 | 4/2015 | Wu et al. | |
| 2015/0109469 A1 | 4/2015 | Oh | |

FOREIGN PATENT DOCUMENTS

| | | |
|---|---|---|
| JP | 2013-062355 | 4/2013 |
| WO | 2004/040599 | 5/2004 |

\* cited by examiner

ELECTROMAGNETIC INDUCTION DEVICE, AND POWER SUPPLY APPARATUS AND DISPLAY APPARATUS HAVING THE SAME

CROSS-REFERENCE TO RELATED APPLICATION

This application is based on and claims priority under 35 U.S.C. § 119 to Korean Patent Application No. 10-2015-0103237, filed on Jul. 21, 2015 in the Korean Intellectual Property Office, the disclosure of which is incorporated by reference herein in its entirety.

BACKGROUND

Field

Apparatuses and methods disclosed herein relate generally to an electromagnetic induction device, and a power supply apparatus and a display apparatus having the same, and for example, to an electromagnetic induction device having a substantially flat structure, and a power supply apparatus and a display apparatus having the same.

Description of Related Art

An electromagnetic induction device such as an inductor, a transformer and an electromagnetic interference (EMI) filter is widely used in an electric/electronic circuit, and serves as an element of various electric/electronic apparatus. For example, such an electromagnetic induction device is needed for a power supply apparatus included in a television (TV), a monitor or the like display apparatus.

By the way, the electromagnetic induction device in the power supply apparatus has been achieved in a thin form in accordance with a recent trend toward a light, thin, short and small display apparatus. For example, a transformer of a switched mode power supply (SMPS) is provided on a printed circuit board having a flat-plate structure.

If the electromagnetic induction device has a thin flat-plate structure, a wiring pattern has high density and is thus vulnerable to heat generated in the electromagnetic induction device. To solve this problem, it may be taken into account that the electromagnetic induction device is made thick (or high) enough for heat dissipation. However, this is not preferable since it is contrary to the purpose of designing the thin electromagnetic induction device.

SUMMARY

One or more example embodiments may provide an electromagnetic induction device having a substantially flat structure, and a power supply apparatus and a display apparatus having the same, in which a problem of heat dissipation is addressed while keeping a thin flat-plate structure.

In accordance with an example embodiment, an electromagnetic induction device is provided, comprising: a substrate layer comprising at least one substrate configured to be laid one upon another and a thin-film coil pattern disposed on at least one of both surfaces of the substrate layer and through which an electric current of a signal flows, the at least one substrate having an opening provided at an inner area of the thin-film coil pattern; a core configured to have a shape corresponding to a circulation path of magnetic flux generated by change in an electric current flowing in the thin-film coil pattern, and arranged to penetrate the inner area of the thin-film coil pattern through the opening in the substrate layer; and a heat dissipation layer disposed on one surface of at least one substrate of the substrate layer, said heat dissipation layer configured to dissipate heat from at least one of the substrate layer and the core.

The heat dissipation layer may have a higher thermal conductivity than the substrate layer.

The heat dissipation layer may comprise a metallic material.

The heat dissipation layer may be shaped like a flat-plate and arranged in parallel with the substrate layer.

The heat dissipation layer may be in thermal-contact with the substrate layer.

The substrate layer and the heat dissipation layer may be formed as a single printed circuit board.

The thin-film coil pattern may comprise a first thin-film coil pattern, and a second thin-film coil pattern through which an electric current induced by change in an electric current flowing in the first thin-film coil pattern flows.

The electromagnetic induction device may further comprise a secondary coil wound on the core, wherein an electric current induced by change in an electric current flowing in the thin-film coil pattern flows in the secondary coil.

At least one circuit device for outputting or receiving the signal is provided in a first area of the substrate layer, the first area being different from a second area where the thin-film coil pattern is provided.

The substrate layer may comprise a first substrate layer formed with a first thin-film coil pattern; and a second substrate layer formed with a second thin-film coil pattern in a first area, and comprising at least one circuit device for outputting or receiving the signal in a second area different from the first area.

The heat dissipation layer may be interposed in between the first substrate layer and the second substrate layer.

In accordance with another example embodiment, a power supply apparatus for supplying power to an electronic apparatus is provided, the power supply apparatus comprising: at least one circuit device; and an electromagnetic induction device electrically connected to the at least one circuit device, the electromagnetic induction device comprising: a substrate layer comprising at least one substrate configured to be laid one upon another and a thin-film coil pattern disposed on at least one of the surfaces of the substrate layer and through which an electric current of a signal flows, the at least one substrate having an opening provided at an inner area of the thin-film coil pattern; a core configured to have a shape corresponding to a circulation path of magnetic flux generated by change in an electric current flowing in the thin-film coil pattern, and arranged to penetrate the inner area of the thin-film coil pattern through the opening of the substrate layer; and a heat dissipation layer disposed on one surface of at least one substrate of the substrate layer, said heat dissipation layer configured to dissipate heat from at least one of the substrate layer and the core.

In accordance with still another example embodiment, a display apparatus is provided, comprising: a signal receiver configured to receive an image signal; a display configured to display an image based on the image signal; and a power supply unit configured to supply power to the display and comprising at least one circuit device and an electromagnetic induction device electrically connected to the at least one circuit device, the electromagnetic induction device comprising: a substrate layer comprising at least one substrate configured to be laid one upon another and a thin-film coil pattern, which is formed on at least one of the surfaces of the substrate layer and through which an electric current of a signal flows, the at least one substrate having an opening provided at an inner area of the thin-film coil pattern; a core configured to have a shape corresponding to a circulation path of magnetic flux generated by change in an electric current flowing in the thin-film coil pattern, and arranged to penetrate the inner area of the thin-film coil pattern through the opening of the substrate layer; and a heat dissipation layer disposed on one surface of at least one substrate of the substrate layer, said heat dissipation layer configured to dissipate heat from at least one of the substrate layer and the core.

BRIEF DESCRIPTION OF THE DRAWINGS

The above and/or other aspects will become apparent and more readily appreciated from the following detailed description, taken in conjunction with the accompanying drawings, in which like reference numerals refer to like elements, and wherein.

DETAILED DESCRIPTION

Figure 1:
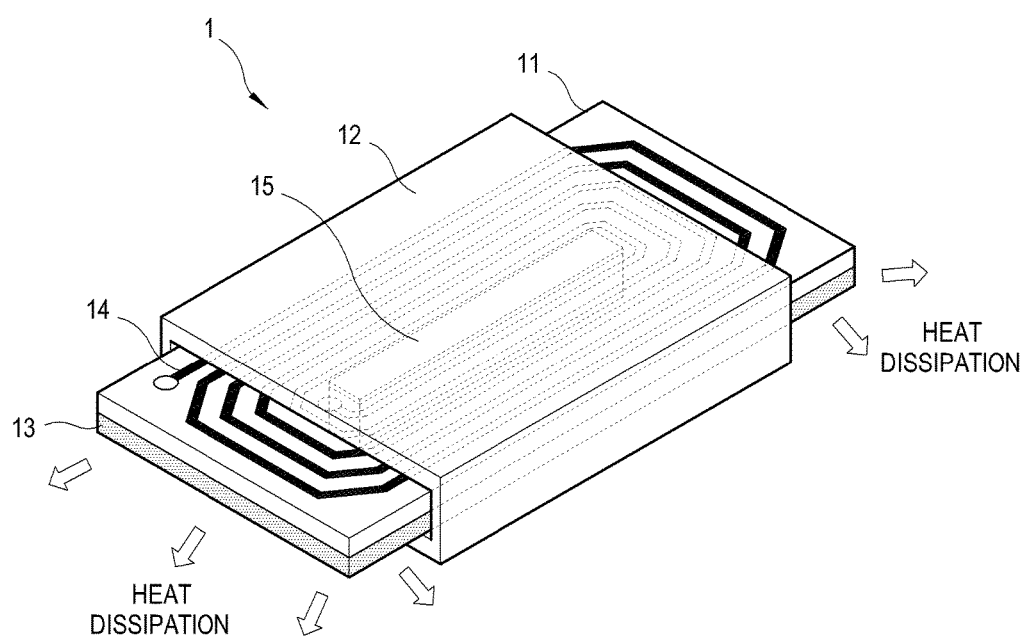
FIGS. 1 to 4 illustrate an example electromagnetic induction device.
Figure 2:
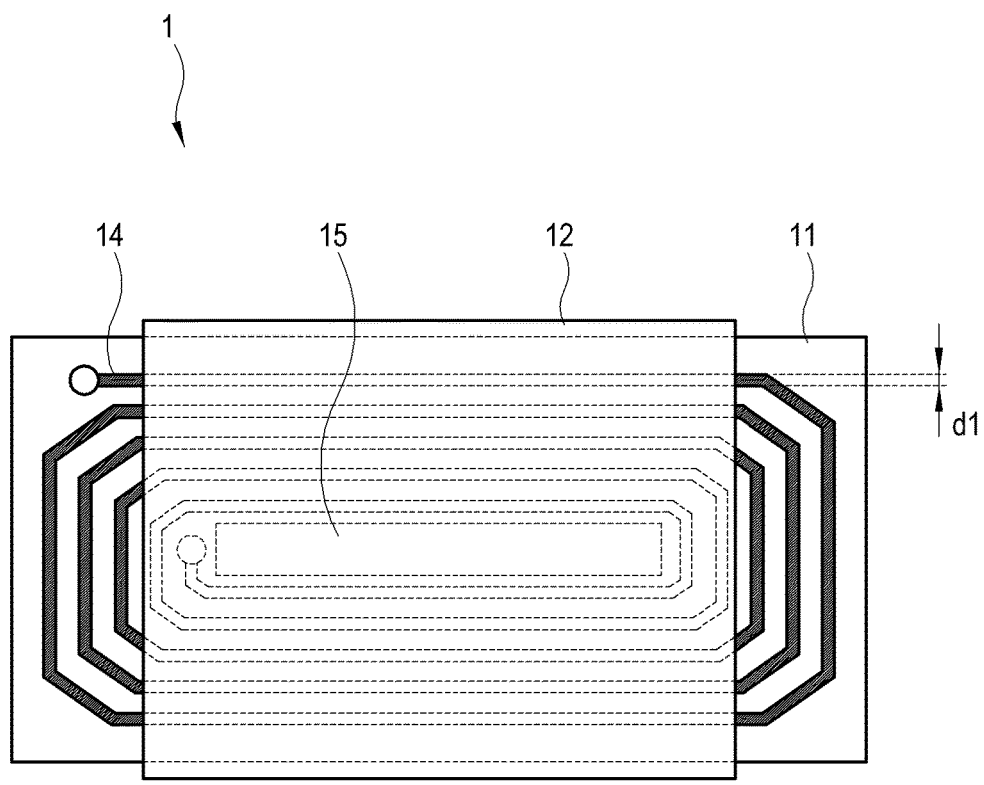
Figure 3:
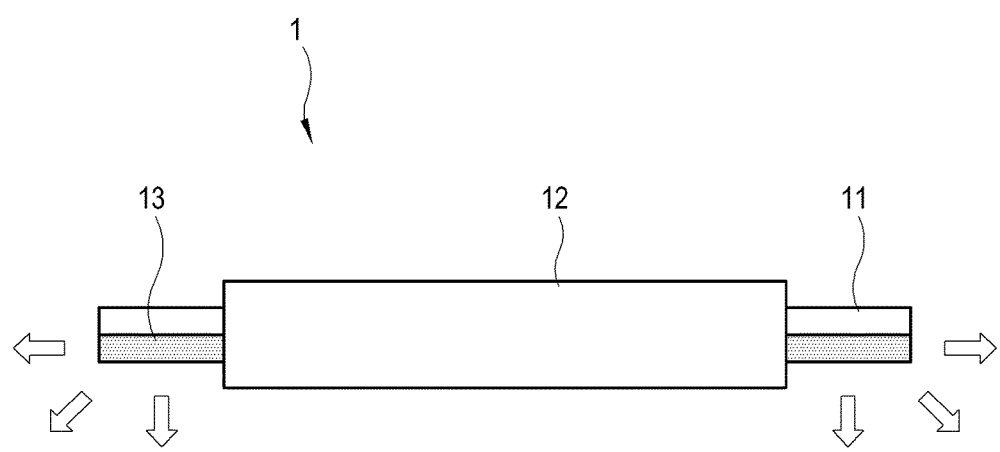
Figure 4:
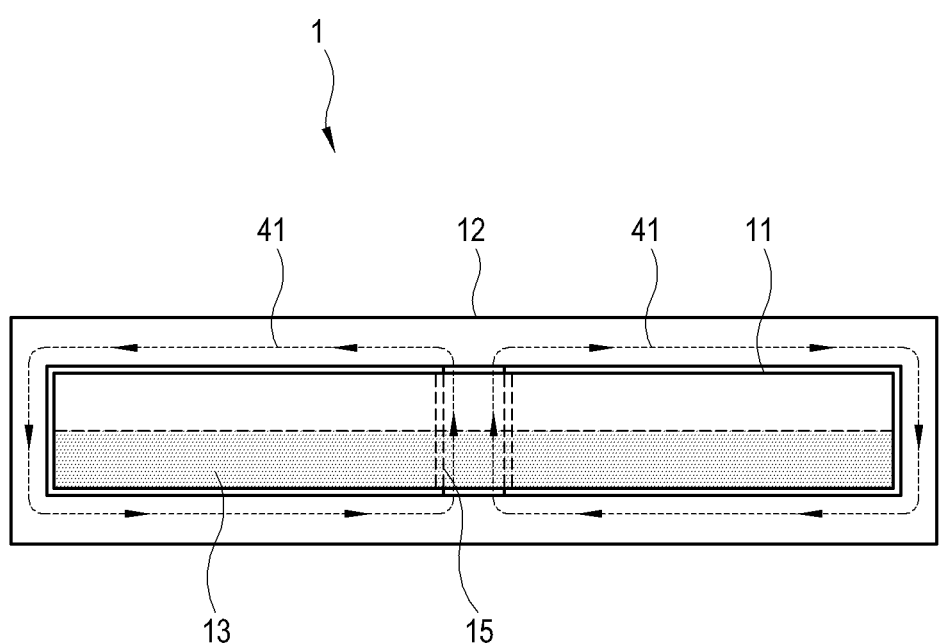

Below, example embodiments will be described in greater detail with reference to the drawings. FIGS. 1 to 4 illustrate an example electromagnetic induction device. FIG. 1 is a perspective view of the electromagnetic induction device 1, and FIGS. 2, 3 and 4 are a plan view, a lateral view and a plan view thereof, respectively. The electromagnetic induction device 1 according to an example embodiment may be an inductor, a transformer, an electromagnetic interference (EMI) filter, or the like.

The electromagnetic induction device 1 according to the example embodiment may include a substrate layer 11, a core 12, and a heat dissipation layer 13 as illustrated in FIGS. 1 to 4. The substrate layer 11 may include at least one substrate that may be laid one upon another. The substrate of the substrate layer 11 may be shaped like a flat plate having a predetermined thickness. Referring to FIGS. 1 to 4, the substrate of the substrate layer 11 has a rectangular shape, but is not limited thereto.

The substrate layer 11 may include a thin-film coil pattern 14, which is formed on at least one of the surfaces of the substrate and through which an electric current of an input signal flows, and an opening 15 provided at an inner area of the thin-film coil pattern 14. The thin-film coil pattern 14 is provided to surround the periphery of the opening 15 spirally by predetermined turns. The substrate of the substrate layer 11 is made of an insulating material, and the thin-film coil pattern 14 is made of highly conducive metal such as copper or the like. The substrate of the substrate layer 11 and the thin-film coil pattern 14 may be achieved by a printed circuit board. For example, the substrate layer 11 may be manufactured by forming the thin-film coil pattern 14 on the substrate.

The core 12 is shaped corresponding to a circulation path 41 of magnetic flux generated by change in the electric current flowing in the thin-film coil pattern 14, and is arranged to penetrate the inner area of the thin-film coil pattern 14 through the opening 15 of the substrate layer 11. The core 12 may be achieved by a magnetic conductor or a magnetic substance, which has higher than a predetermined magnetic permeability to sufficiently generate and maintain the magnetic flux.

The heat dissipation layer 13 dissipates heat transferred from at least one of the substrate layer 11 and the core 12. The heat dissipation layer 13 has a flat-plate shape like the substrate layer 11, and is arranged beneath the substrate layer 11. The heat dissipation layer 13 may be made of a substance having higher than a predetermined heat-transfer coefficient. For example, the heat dissipation layer 13 may be made of metal. FIG. 1 illustrates that the heat dissipation layer 13 is arranged beneath the substrate layer 11, but is not limited thereto. Alternatively, the heat dissipation layer 13 may be arranged on the substrate layer 11. Between the heat dissipation layer 13 and the substrate layer 11 is provided an insulation layer for interrupting an electric current.

The heat dissipation layer 13 and the substrate layer 11 may be formed as a single body. For example, the substrate layer 11 and the heat dissipation layer 13 may be achieved by forming the thin-film coil pattern 14 on the substrate shaped like a disk plate by the manufacturing method for the printed circuit board, and forming the heat dissipation layer 13 on one surface of the substrate layer 11. There are no limits to order of forming the heat dissipation layer 13. For example, the heat dissipation layer 13 may be formed after forming the substrate layer 11, or the substrate layer 11 may be formed after forming the heat dissipation layer 13. In addition, the substrate layer 11 and the heat dissipation layer 13 may be formed individually and then attached to each other.

The substrate layer 11 is formed with the thin-film coil pattern 14, and generates heat when an electric current flows in the thin-film coil pattern 14. The heat dissipation layer 13 may be in direct contact with the substrate layer 11, or may thermally contact the substrate layer 11 via the insulation layer or the like interposed therebetween. When the substrate layer 11 generates heat, the heat is transferred to the heat dissipation layer 13. Since the heat dissipation layer 13 has a relatively high thermal conductivity, it is enough to transfer the heat from the substrate layer 11 to the heat dissipation layer 13. A part of the heat dissipation layer 13, which does not thermally contact the substrate layer 11, is exposed to the air outside, and thus the heat transferred from the substrate layer 11 to the heat dissipation layer 13 radiates toward the air outside. Since the heat generated from the substrate layer 11 radiates toward the air outside through the heat dissipation layer 13, it is possible to reduce a rise in temperature of the electromagnetic induction device 1. In particular, heat is efficiently dissipated through the heat dissipation layer 13 even if the high density of the coil pattern causes the electromagnetic induction device 1 to generate much heat as the electromagnetic induction device 1 is thinly designed to have a thickness smaller than a predetermined value.

Figure 5:
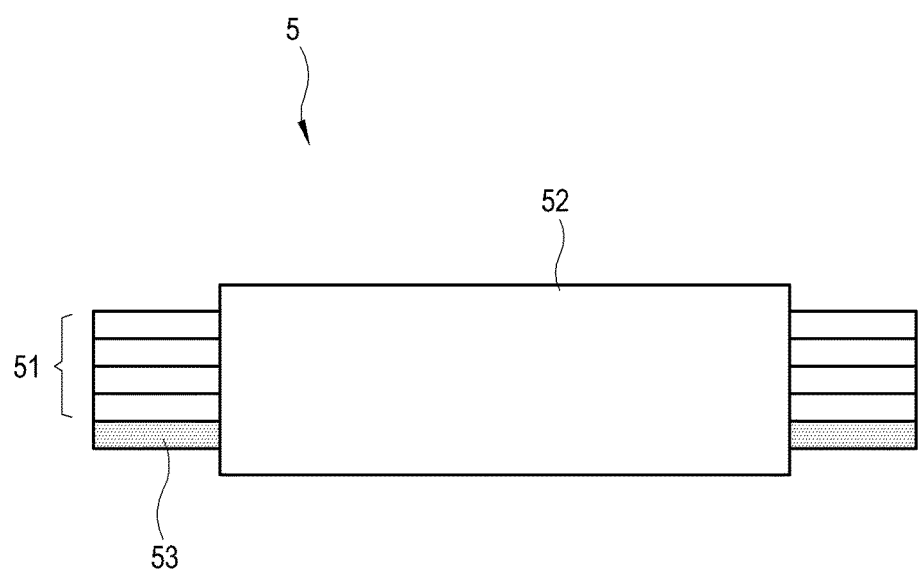
FIG. 5 illustrates another example electromagnetic induction device.

FIG. 5 illustrates another example of the electromagnetic induction device. Regarding an electromagnetic induction device 5 illustrated in FIG. 5, repetitive descriptions about the same or similar elements to those of the electromagnetic induction device 1 shown in FIGS. 1 to 4 will be avoided as necessary. In this example embodiment, the electromagnetic induction device 5 may include a plurality of substrate layers 51, a core 52, and a heat dissipation layer 53. The plurality of substrate layers 51 may be achieved by laying the substrate layers 11 shown in FIGS. 1 to 4 one upon another. The thin-film coil patterns in the plurality of substrate layers 51 may be electrically connected to each other. With the plurality of substrate layers 51, it is possible to increase the number of thin-film coil patterns and thus increase the number of coil turns wound on the core 52, thereby increasing the inductance of the electromagnetic induction device 5. The heat dissipation layer 53 may be arranged beneath the lowermost substrate layer 51 so as to be exposed to the air outside as much as possible. However, there are no limits to the arrangement of the heat dissipation layer 53. Alternatively, the heat dissipation layer 53 may be arranged on the uppermost substrate layer 51.

Figure 6:
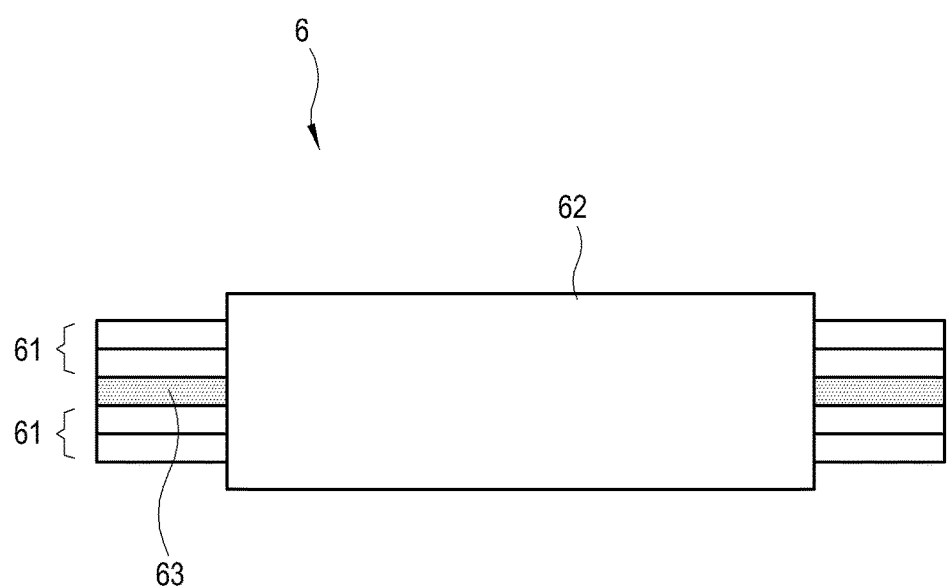
FIG. 6 illustrates still another electromagnetic induction device.

FIG. 6 illustrates an example electromagnetic induction device according to still another example embodiment. Regarding the electromagnetic induction device 6 illustrated in FIG. 6, repetitive descriptions about the same or similar elements to those of the electromagnetic induction devices 1 and 5 shown in FIGS. 1 to 5 will be avoided as necessary. In this example embodiment, the electromagnetic induction device 6 may include a plurality of substrate layers 61, a core 62, and a heat dissipation layer 63. The heat dissipation layer 63 may be arranged in between the plurality of substrate layers 61. This arrangement is useful when it is difficult to arrange the heat dissipation layer 63 on the uppermost and lowermost sides of the plurality of substrate layers 61 in accordance with design.

Figure 7:
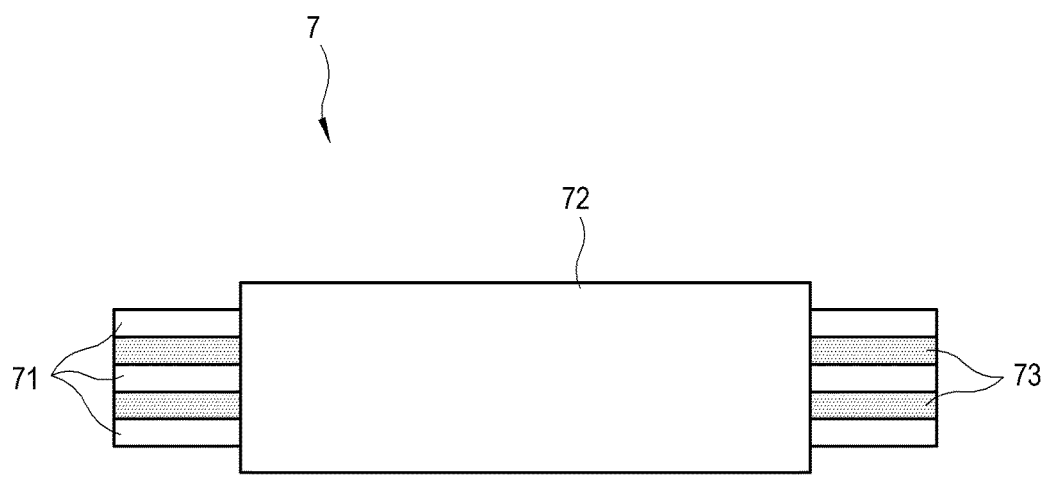
FIG. 7 illustrates yet another electromagnetic induction device.

FIG. 7 illustrates an example electromagnetic induction device according to yet another example embodiment. Regarding the electromagnetic induction device 7 illustrated in FIG. 7, repetitive descriptions about the same or similar elements to those of the electromagnetic induction devices 1, 5 and 6 illustrated in FIGS. 1 to 6 will be avoided as necessary. In this example embodiment, the electromagnetic induction device 7 may include a plurality of substrate layers 71, a core 72, and a plurality of heat dissipation layers 73. To have the maximum or increased effect on dissipating heat, the electromagnetic induction device 7 in this example embodiment includes the plurality of heat dissipation layers 73. According to this example embodiment, the plurality of heat dissipation layers 73 may be respectively arranged in between the plurality of substrate layers 71. However, there are no limits to the arrangement of the plurality of heat dissipation layers 73. Alternatively, at least one heat dissipation layer 73 may be arranged on the uppermost or lowermost side of the plurality of substrate layer 71.

Figure 8:
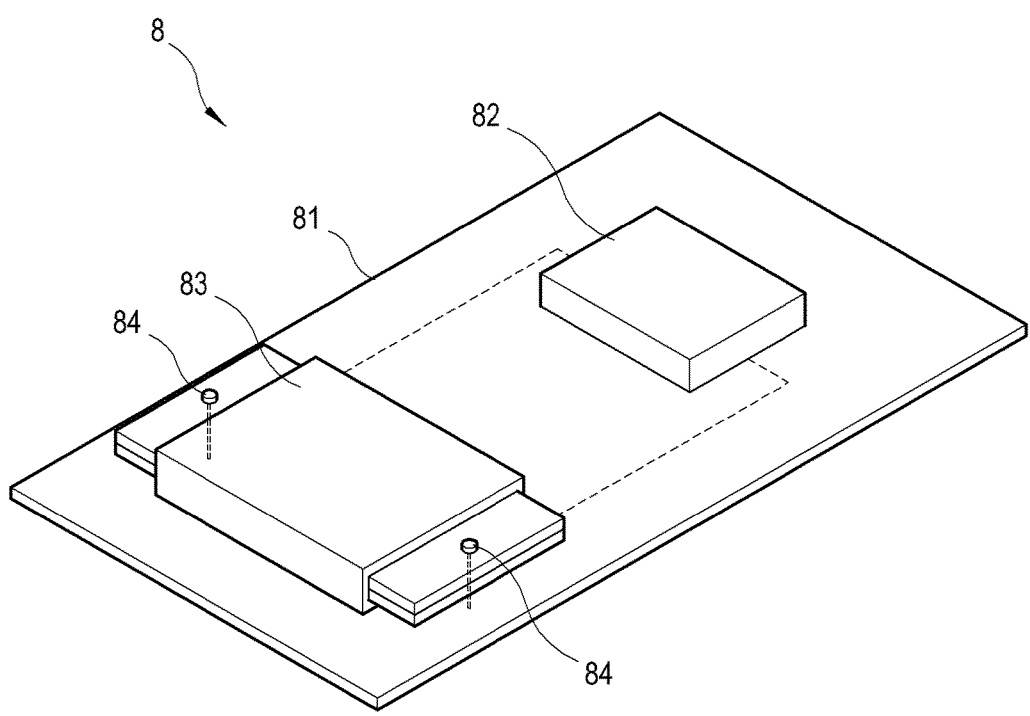
FIGS. 8 and 9 illustrate an example power supply apparatus.
Figure 9:
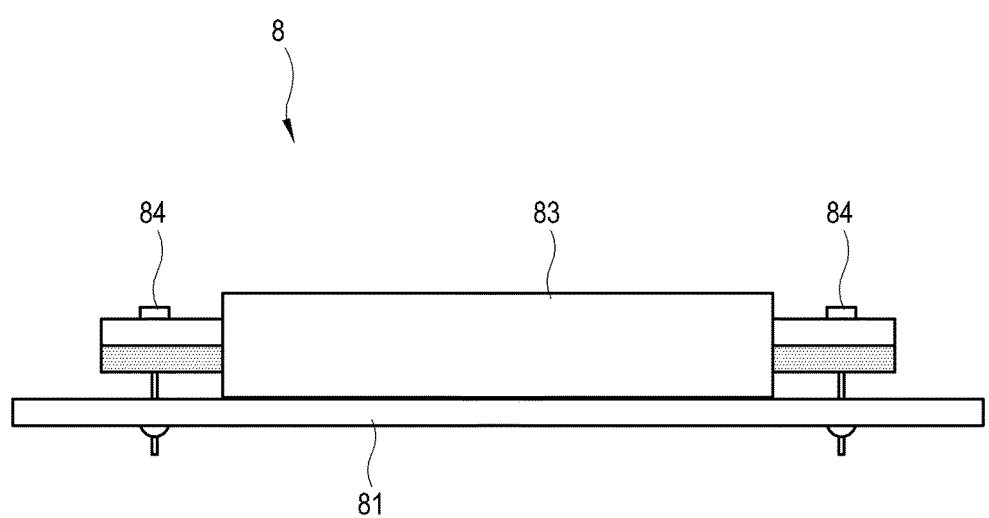

FIGS. 8 and 9 illustrate an example power supply apparatus according to an example embodiment. FIG. 8 is a perspective view of a power supply apparatus 8, and FIG. 9 is a lateral view of the power supply apparatus 8. In this example embodiment, the power supply apparatus 8 may include a base substrate 81, at least one circuit device 82, and an electromagnetic induction device 83. The base substrate 81 is achieved by a printed circuit board, at least one circuit device 82, and an electromagnetic induction device 83. At least one circuit device 82 includes a device needed for receiving electric power from the outside and transforming the level of the received power into a predetermined level. For example, at least one circuit device 82 may include a resistor, a capacitor, a transistor, a diode, etc. For convenience of description, at least one circuit device 82 illustrated in FIG. 8 is illustrated as a single box-shaped device, but not limited thereto. Alternatively, two or more circuit devices may be provided on the base substrate 81 and may have various shapes. For example, at least one circuit device 82 may be not separately provided but provided in one among a plurality of layers that constitute the base substrate 81.

The electromagnetic induction device 83 has the same or similar elements to those of the electromagnetic induction devices 1, 5, 6 and 7 illustrated in FIGS. 1 to 7, and a thin-film coil pattern provided on the substrate layer of the electromagnetic induction device 83 is electrically connected to at least one circuit device 82. The electromagnetic induction device 83 may be fastened to the base substrate 81 with fastening pins 84 provided at the opposite sides.

Figure 10:
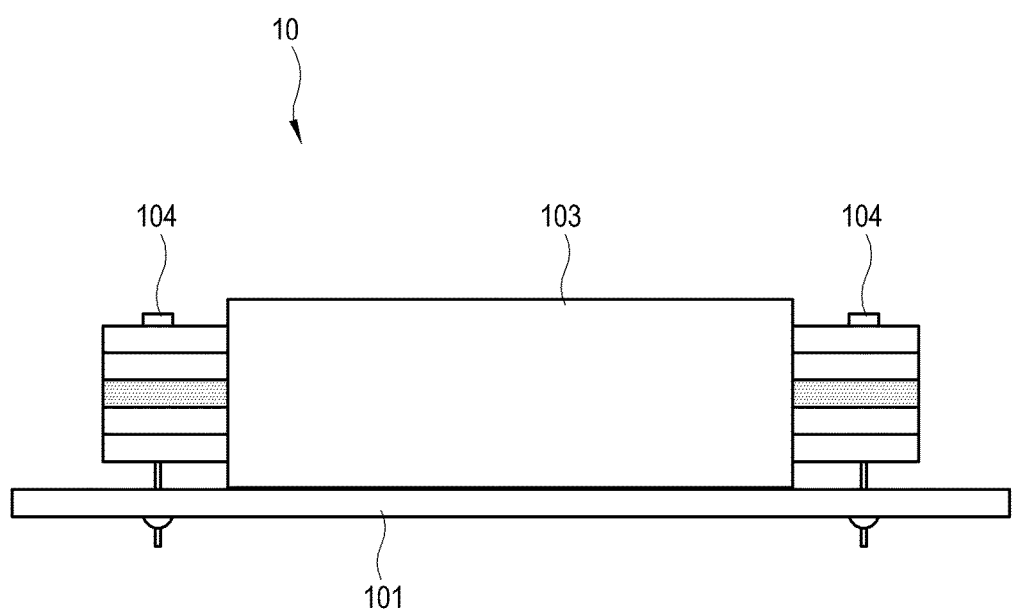
FIG. 10 illustrates another example power supply apparatus.

FIG. 10 illustrates an example power supply apparatus according to another example embodiment. Regarding a power supply apparatus 10 illustrated in FIG. 10, repetitive descriptions about the same or similar elements to those of the power supply apparatus 8 illustrated in FIGS. 8 and 9 will be avoided as necessary. In this example embodiment, the power supply apparatus 10 may include a base substrate 101, at least one circuit device (not shown), and an electromagnetic induction device 103. The electromagnetic induction device 103 may include a plurality of substrate layers.

Figure 11:
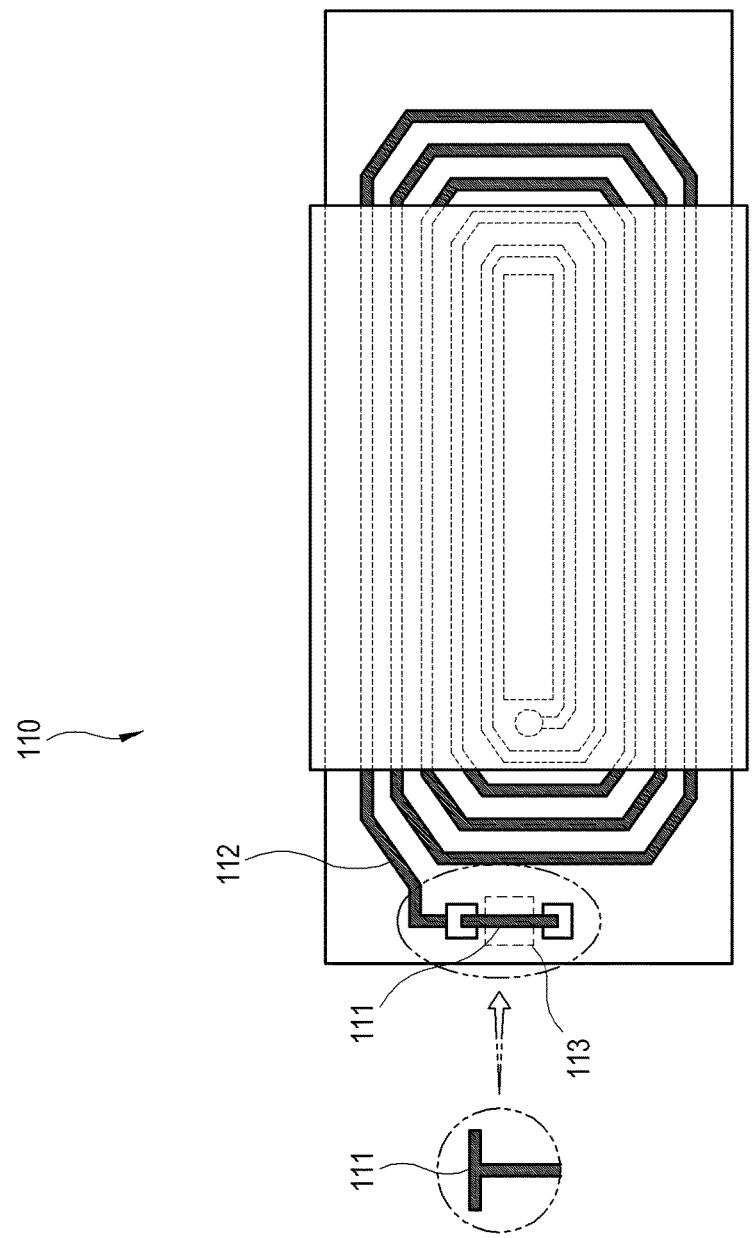
FIG. 11 illustrates yet another electromagnetic induction device.

FIG. 11 illustrates an example electromagnetic induction device according to another example embodiment. Regarding the electromagnetic induction device 110 illustrated in FIG. 11, repetitive descriptions about the same or similar elements to those of the electromagnetic induction device 1, 5, 6, 7 and 83 illustrated in FIGS. 1 to 9 will be avoided as necessary. In this example embodiment, the electromagnetic induction device 110 is fastened to the base substrate by a fastening pin 111. According to this example embodiment, the fastening pin 111 may have a T-shape and be made of metal. The fastening pin 111 electrically contacts a thin-film coil pattern 112 of the electromagnetic induction device 110. Therefore, the thin-film coil pattern 112 is electrically connected to another circuit device provided in the base substrate via the fastening pin 111. The electromagnetic induction device 110 may have an opening 113 which is formed in a partial area of the substrate layer and through which the fastening pin 111 passes. Therefore, it is possible to prevent or avoid a short circuit since the fastening pin 111 is not in contact with another thin-film coil pattern provided in another substrate inside the substrate layer.

Referring back to FIG. 2, the electromagnetic induction device 1 according to the example embodiment can effectively dissipate heat generated in the thin-film coil pattern 14 through the heat dissipation layer 13, thereby minimizing or reducing temperature rise of the electromagnetic induction device 1. Thus, the turn number of the thin-film coil pattern 14 is increased by reducing the width d1 of the thin-film coil pattern 14 within an allowable temperature limit of the electromagnetic induction device 1. Therefore, the electromagnetic induction device 1 according to the example embodiment can effectively achieve a target inductance since the width d1 of the thin-film coil pattern 14 is minimized or reduced to have a desired turn number.

Figure 12:
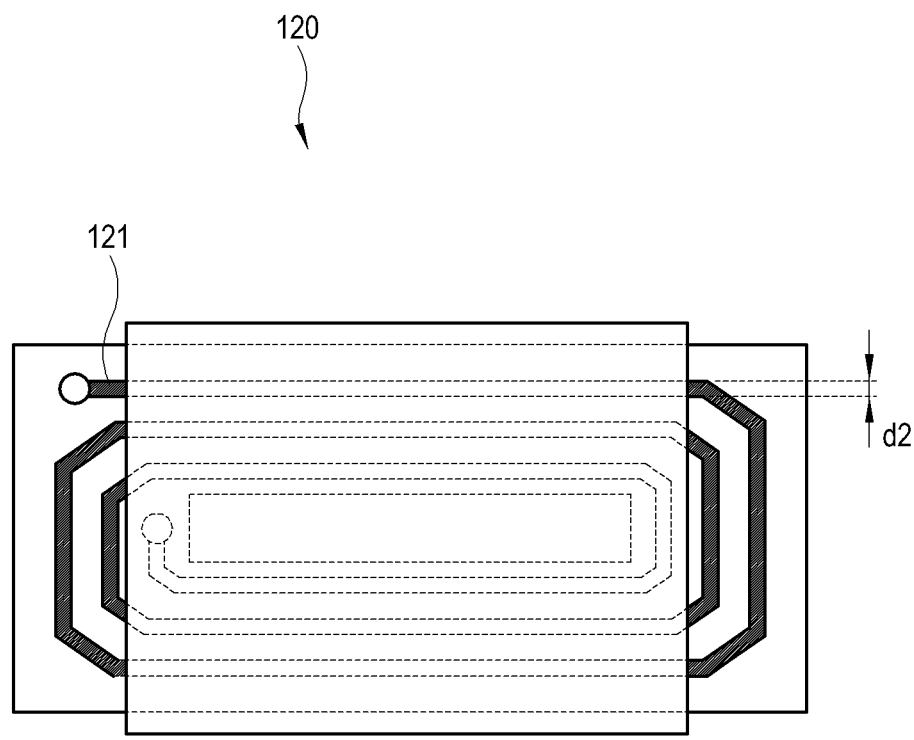
FIG. 12 is a plan view of an example electromagnetic induction device.

FIG. 12 is a plan view of an example electromagnetic induction device 120 according to a comparative embodiment. The electromagnetic induction device 120 according to the comparative embodiment does not have the heat dissipation layer. To acquire an equivalent inductance under the same conditions, a width d2 of a thin-film coil pattern 121 of the electromagnetic induction device 120 is larger than the width d1 of the thin-film coil pattern 14 of the electromagnetic induction device 1 according to the example embodiment illustrated in FIG. 2. That is, the electromagnetic induction device 120 according to the comparative embodiment is likely to rise in temperature since it has no heat dissipation layer, and it is therefore impossible to reduce the width d2 of the thin-film coil pattern 121. Accordingly, the electromagnetic induction device 1 according to the example embodiment is designed to make the thin-film coil pattern 14 have a more minute width d1 and has a higher design degrees of freedom than those of the electromagnetic induction device 120 according to the comparative embodiment.

Figure 13:
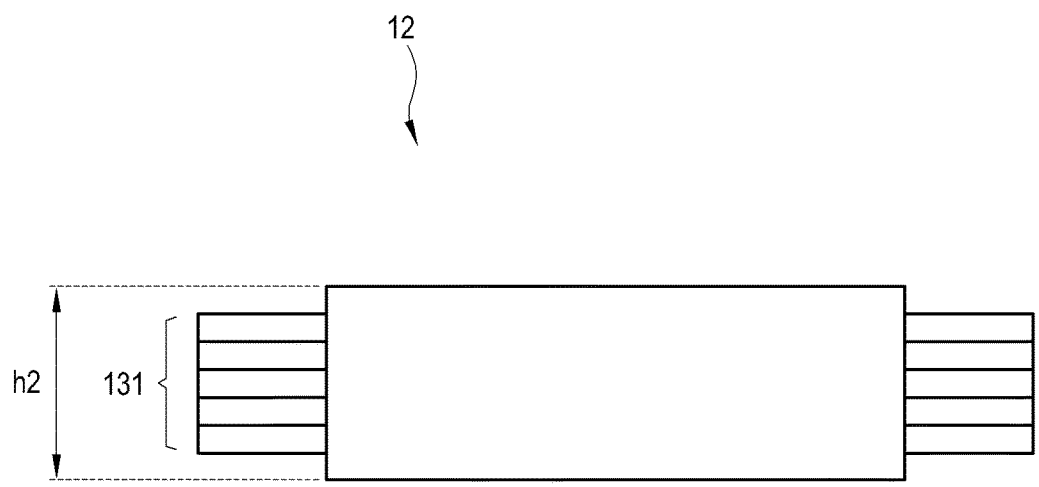
FIG. 13 is a lateral view of an example electromagnetic induction device.

FIG. 13 is a lateral view of the example electromagnetic induction device 120 according to the comparative embodiment. For example, the electromagnetic induction device 12 according to the comparative embodiment may include five substrate layers respectively provided with the thin-film coil patterns 121 of the width d2 shown in FIG. 12 in order to achieve a predetermined inductance.

Figure 14:
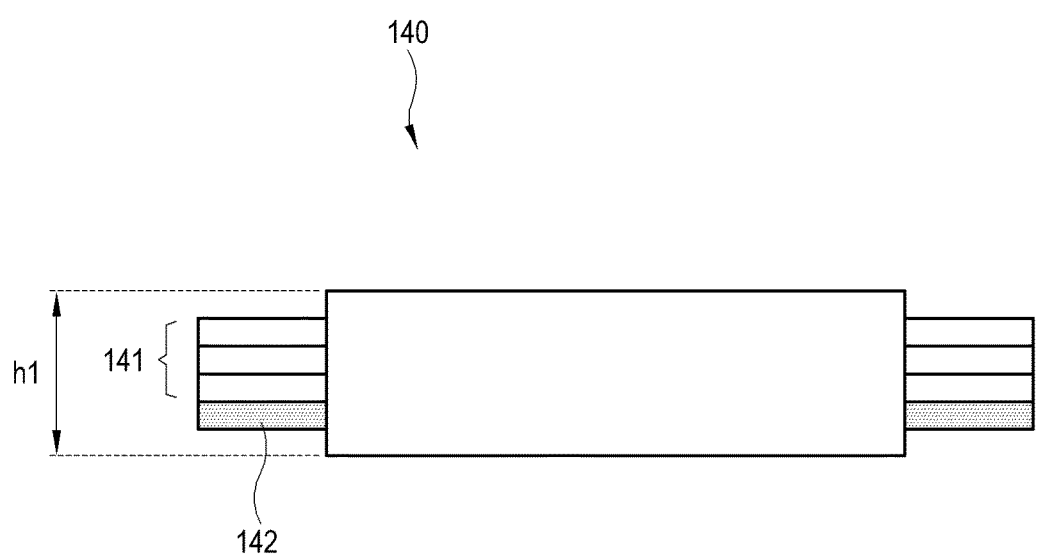
FIG. 14 is a lateral view of an example electromagnetic induction device.

FIG. 14 is a lateral view of an example electromagnetic induction device 140 according to an example embodiment. The electromagnetic induction device 140 according to this example embodiment may include a plurality of substrate layers 141, and a heat dissipation layer 142. To acquire an inductance equivalent to that of the electromagnetic induction device 120 according to the comparative embodiment illustrated in FIGS. 12 and 13, the electromagnetic induction device 140 according to this example embodiment may include three substrate layers respectively provided with thin-film coil patterns 14 of the width d1 illustrated in FIG. 2. That is, the electromagnetic induction device 140 according to this example embodiment uses a thin-film coil pattern 14 having the width d1 smaller than the width d2 of the thin-film coil pattern 121 of the electromagnetic induction device 120 according to the comparative embodiment, thereby having the thin-film coil pattern 14 of higher turn number. Therefore, fewer substrate layers are enough to acquire the inductance equivalent to that of the electromagnetic induction device 120 according to the comparative embodiment. Accordingly, the thickness or height h1 of the electromagnetic induction device 140 according to this example embodiment is smaller than that h2 of the electromagnetic induction device 120 according to the comparative embodiment. According to an example embodiment, the electromagnetic induction device 140 not only has a thin structure of small thickness or height, but also solves a problem of heat dissipation.

FIGS. 15 to 22 illustrate an example structure of a substrate layer according to an example embodiment. For example, the substrate layer 150 illustrated in FIG. 15 to 22 may be achieved by an inductor which includes a plurality of substrates 151 to 221. FIGS. 15 to 22 respectively illustrate the tops and/or bottoms of the plurality of substrates 151 to 221. The plurality of substrates 151 to 221 are shaped like a thin plate having a predetermined thickness, and laid one upon another to constitute the substrate layer 150. The plurality of substrates 151 to 221 may be additionally provided with insulation layers interposed for electric insulation therebetween.

Figure 15:
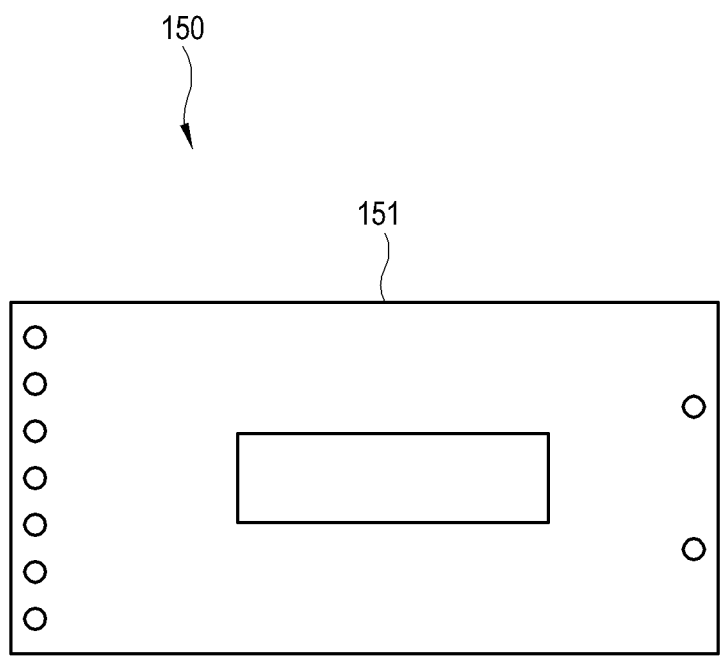
FIGS. 15 to 22 illustrate an example structure of a substrate layer.
Figure 16:
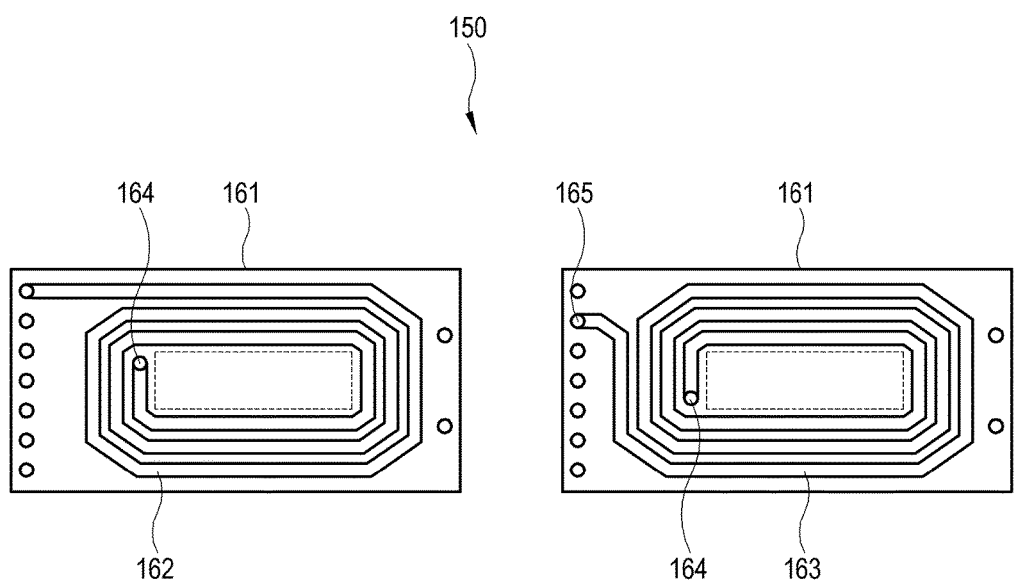
Figure 17:
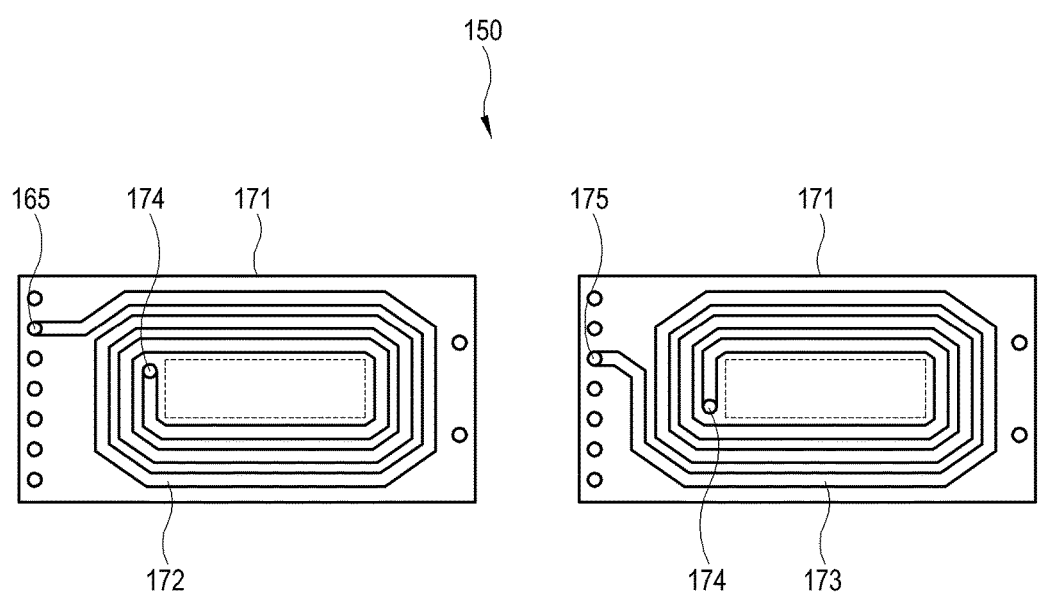

FIG. 15 illustrates an uppermost first substrate 151 of the substrate layer 150. FIG. 16 illustrates a second substrate 161. A first thin-film coil pattern 162 and a second thin-film coil pattern 163 are respectively provided on the top and bottom of the second substrate 161. The first thin-film coil pattern 162 connects with the second thin-film coil pattern 163 through a via 164. FIG. 17 illustrates a third substrate 171. A third thin-film coil pattern 172 and a fourth thin-film coil pattern 173 are respectively provided on the top and bottom of the third substrate 171. The third thin-film coil pattern 172 connects with the second thin-film coil pattern 163 of the second substrate 161 through a via 165. Further, the third thin-film coil pattern 172 connects with the fourth thin-film coil pattern 173 through a via 175.

Figure 18:
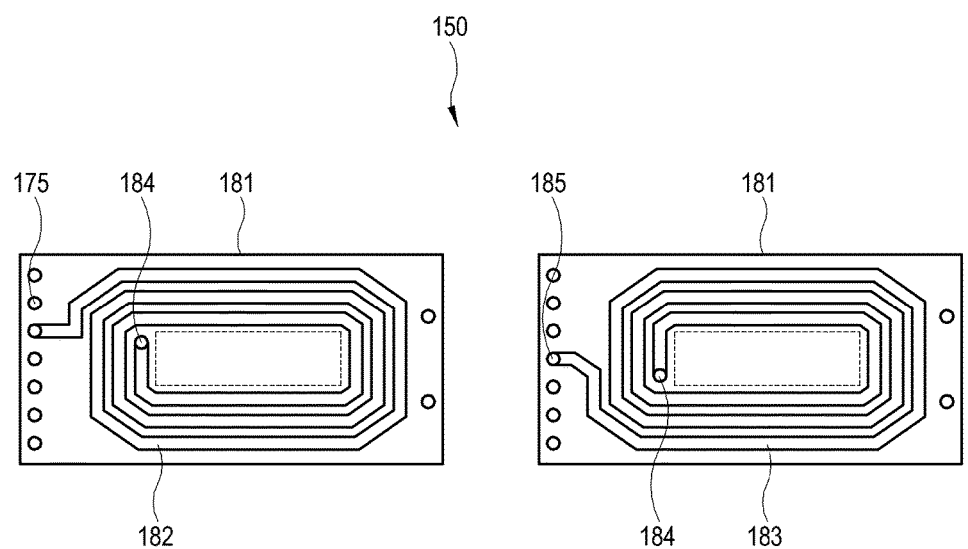
Figure 19:
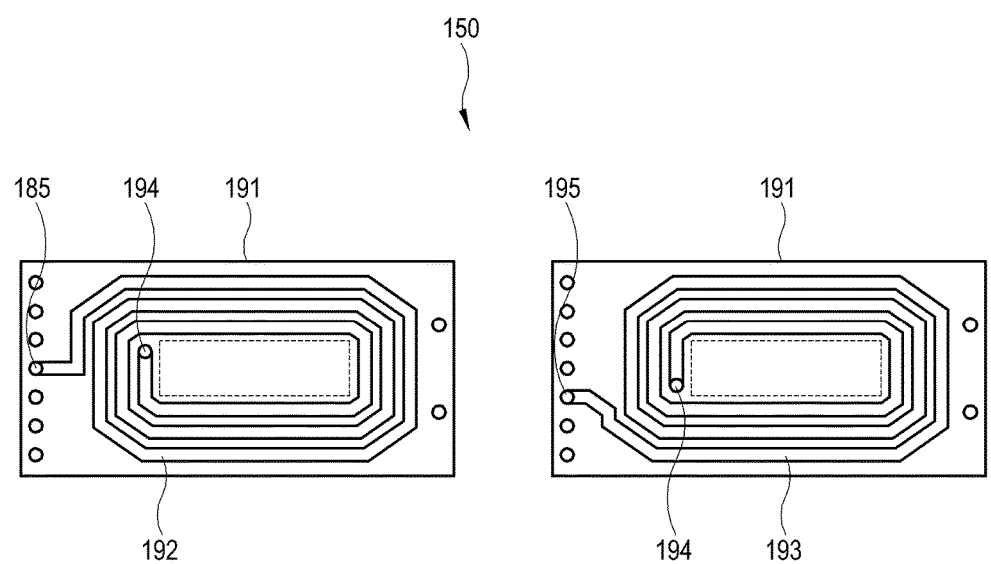

FIG. 18 illustrates a fourth substrate 181. A fifth thin-film coil pattern 182 and a sixth thin-film coil pattern 183 are respectively provided on the top and bottom of the fourth substrate 181. The fifth thin-film coil pattern 182 connects with the fourth thin-film coil pattern 173 of the third substrate 171 through a via 175. Further, the fifth thin-film coil pattern 182 connects with the sixth thin-film coil pattern 183 through a via 185. FIG. 19 illustrates a fifth substrate 191. A seventh thin-film coil pattern 192 and an eighth thin-film coil pattern 193 are respectively provided on the top and bottom of the fifth substrate 191. The seventh thin-film coil pattern 192 connects with the sixth thin-film coil pattern 183 of the fourth substrate 181 through a via 185. Further, the seventh thin-film coil pattern 192 connects with the eighth thin-film coil pattern 193 through a via 195.

Figure 20:
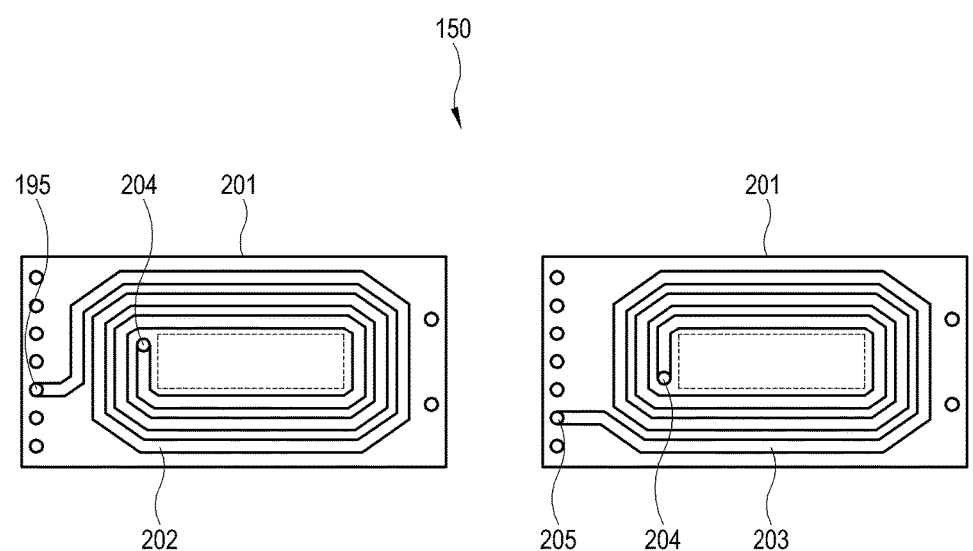
Figure 21:
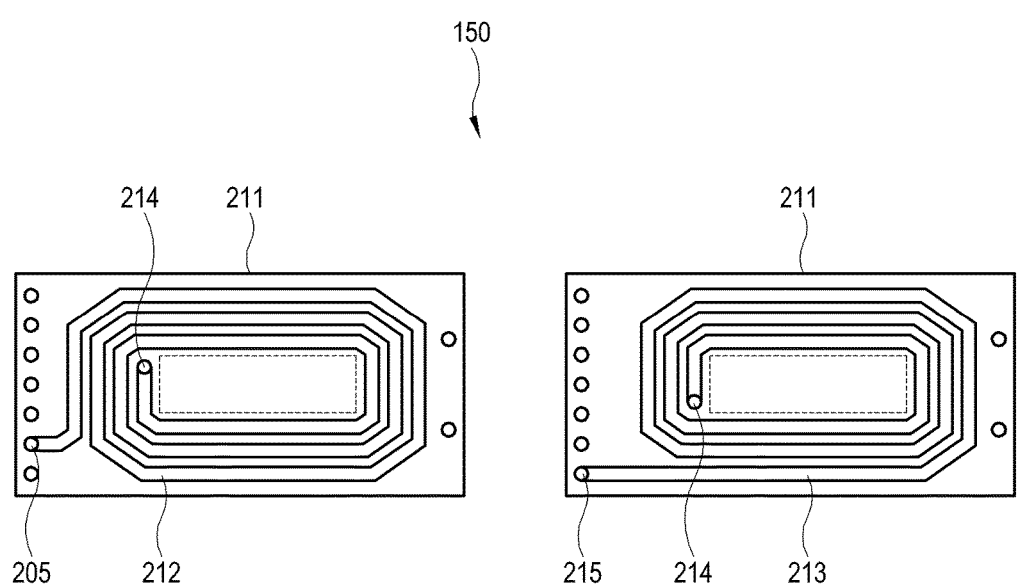
Figure 22:
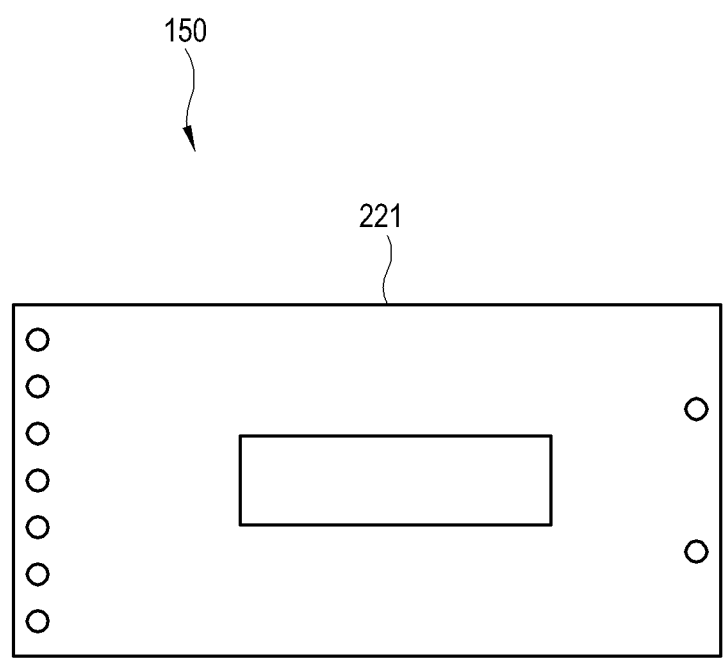

FIG. 20 illustrates a sixth substrate 201. A ninth thin-film coil pattern 202 and a tenth thin-film coil pattern 203 are respectively provided on the top and bottom of the sixth substrate 201. The ninth thin-film coil pattern 202 connects the eighth thin-film coil pattern 193 of the fifth substrate 191 through the via 195. Further, the ninth thin-film coil pattern 202 connects with the tenth thin-film coil pattern 203 through a via 205. FIG. 21 illustrates the seventh substrate 211. An eleventh thin-film coil pattern 212 and a twelfth thin-film coil pattern 213 are respectively provided on the top and bottom of the seventh substrate 211. The eleventh thin-film coil pattern 212 connects with the tenth thin-film coil pattern 203 of the sixth substrate 201 through the via 205. Further, the eleventh thin-film coil pattern 212 connects with the twelfth thin-film coil pattern 213 through a via 215. FIG. 22 illustrates a lowermost eighth substrate 221 of the substrate layer 150.

FIGS. 23 to 30 illustrate an example structure of a substrate layer according to an example embodiment. For example, a substrate layer 23 illustrated in FIGS. 23 to 30 may be achieved by a transformer which includes a plurality of substrates 231 to 301. FIGS. 23 to 30 respectively illustrate the tops and/or bottoms of the plurality of substrates 231 to 301. The plurality of substrates 231 to 301 are shaped like a thin plate having a predetermined thickness, and laid one upon another to comprise the substrate layer 23. The plurality of substrates 231 to 301 may be additionally provided with insulation layers interposed for electric insulation therebetween.

Figure 23:
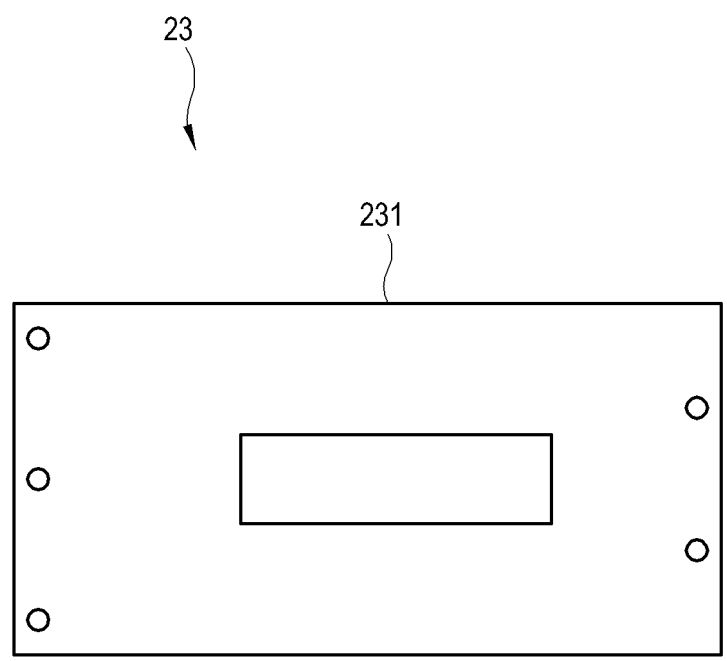
FIGS. 23 to 30 illustrate an example structure of a substrate layer.
Figure 24:
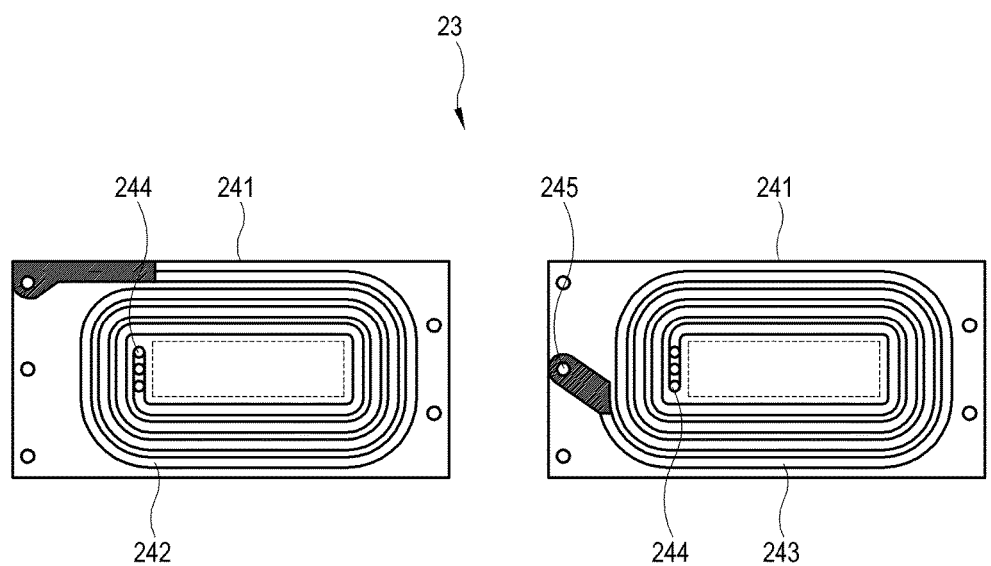
Figure 25:
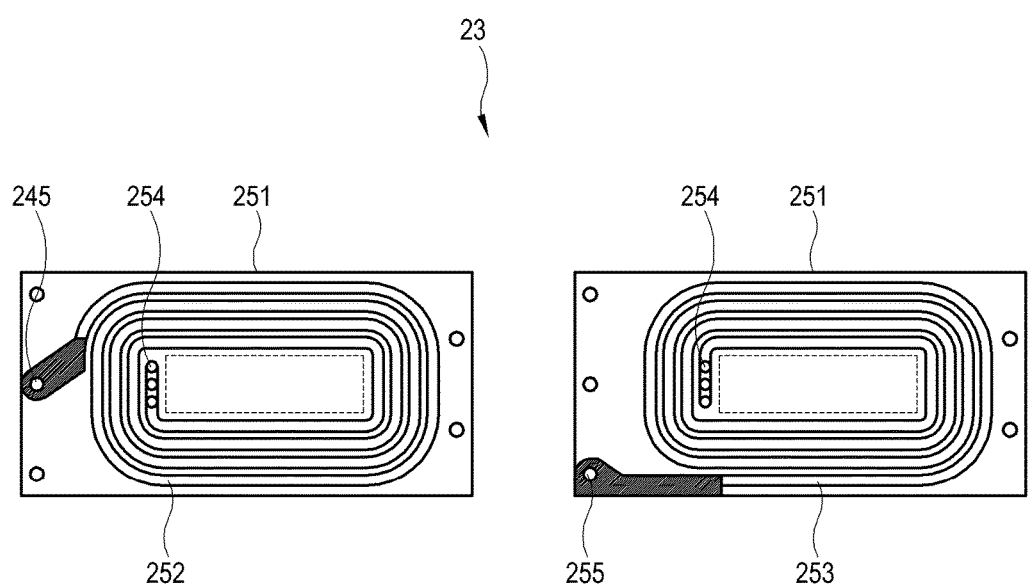

FIG. 23 illustrates an uppermost first substrate 231 of the substrate layer 23. FIG. 24 illustrates a second substrate 241. A first thin-film coil pattern 242 and a second thin-film coil pattern 243 are respectively provided on the top and bottom of the second substrate 241. The first thin-film coil pattern 242 connects with the second thin-film coil pattern 243 through a via 244. FIG. 25 illustrates a third substrate 251. A third thin-film coil pattern 252 and a fourth thin-film coil pattern 253 are respectively provided on the top and bottom of the third substrate 251. The third thin-film coil pattern 252 connects with the second thin-film coil pattern 243 of the second substrate 241 through a via 245. Further, the third thin-film coil pattern 252 connects with the fourth thin-film coil pattern 253 through a via 255.

Figure 26:
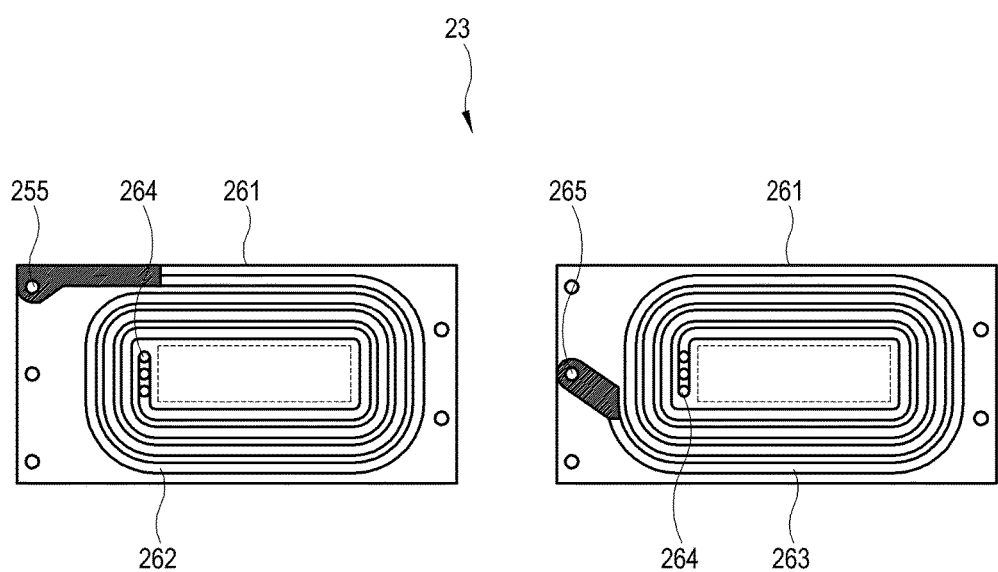
Figure 27:
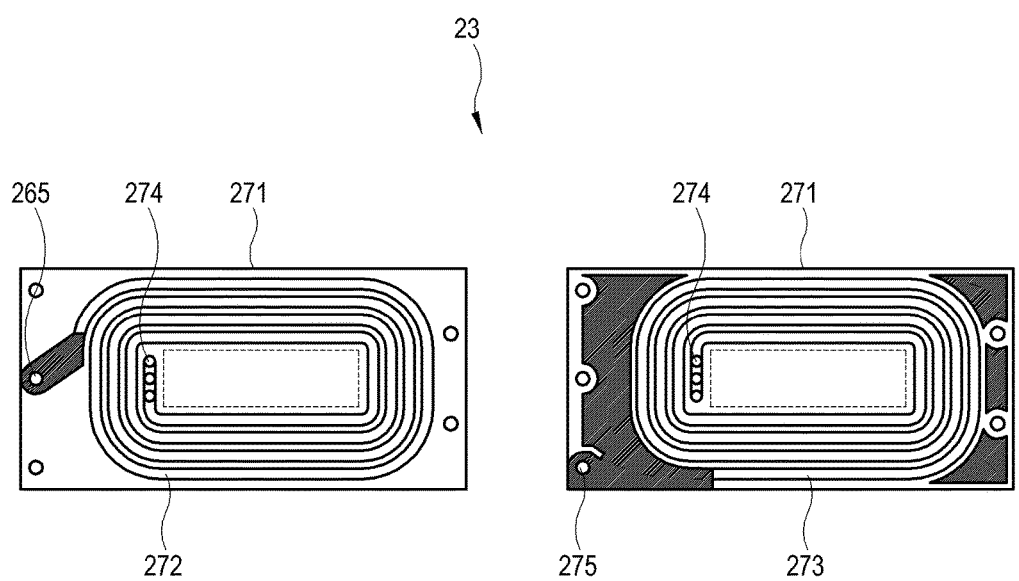

FIG. 26 illustrates a fourth substrate 261. A fifth thin-film coil pattern 262 and a sixth thin-film coil pattern 263 are respectively provided on the top and bottom of the fourth substrate 261. The fifth thin-film coil pattern 262 connects with the fourth thin-film coil pattern 253 of the third substrate 251 through the via 255. Further, the fifth thin-film coil pattern 262 connects with the sixth thin-film coil pattern 263 through a via 265. FIG. 27 illustrates a fifth substrate 271. A seventh thin-film coil pattern 272 and an eighth thin-film coil pattern 273 are respectively provided on the top and bottom of the fifth substrate 271. The seventh thin-film coil pattern 272 connects with the sixth thin-film coil pattern 263 of the fourth substrate 261 through the via 265. Further, the seventh thin-film coil pattern 272 connects with the eighth thin-film coil pattern 273 through a via 275.

Figure 28:
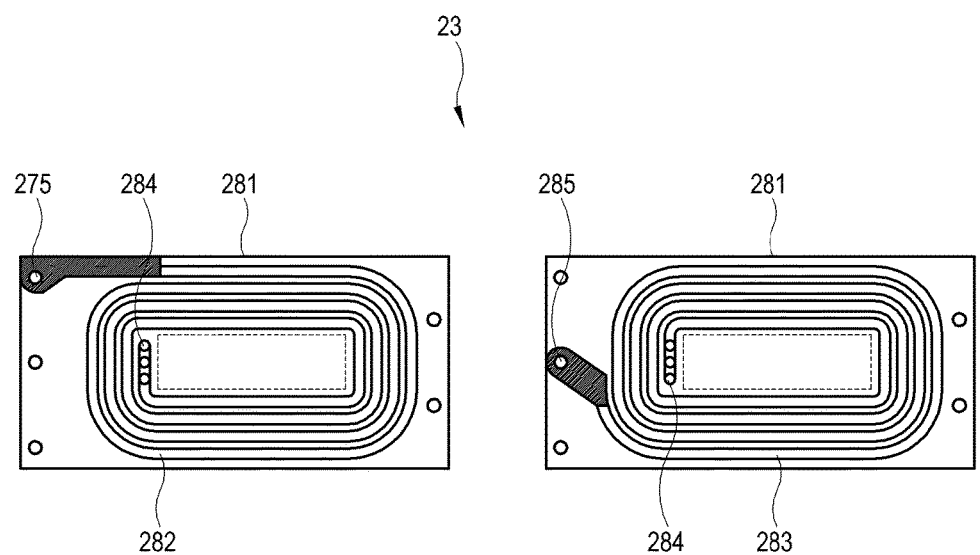
Figure 29:
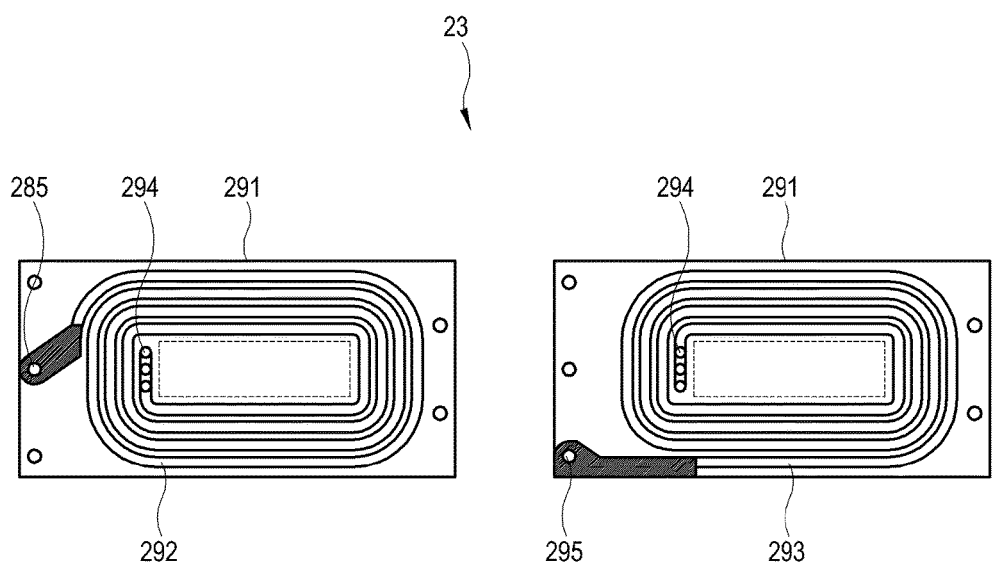
Figure 30:
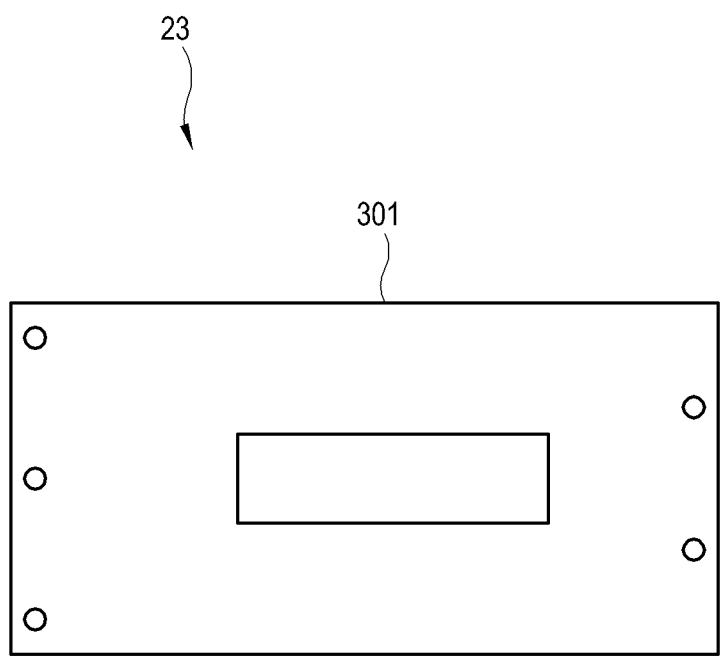

FIG. 28 illustrates a sixth substrate 281. A ninth thin-film coil pattern 282 and a tenth thin-film coil pattern 283 are respectively provided on the top and bottom of the sixth substrate 281. The ninth thin-film coil pattern 282 connects with the eighth thin-film coil pattern 273 of the fifth substrate 271 through the via 275. Further, the ninth thin-film coil pattern 282 connects with the tenth thin-film coil pattern 283 through a via 285. FIG. 29 shows the seventh substrate 291. An eleventh thin-film coil pattern 292 and a twelfth thin-film coil pattern 293 are respectively provided on the top and bottom of the seventh substrate 291. The eleventh thin-film coil pattern 292 connects with the tenth thin-film coil pattern 283 of the sixth substrate 281 through the via 285. Further, the eleventh thin-film coil pattern 292 connects with the twelfth thin-film coil pattern 293 through a via 295. FIG. 30 illustrates a lowermost eighth substrate 301 of the substrate layer 23.

Figure 31:
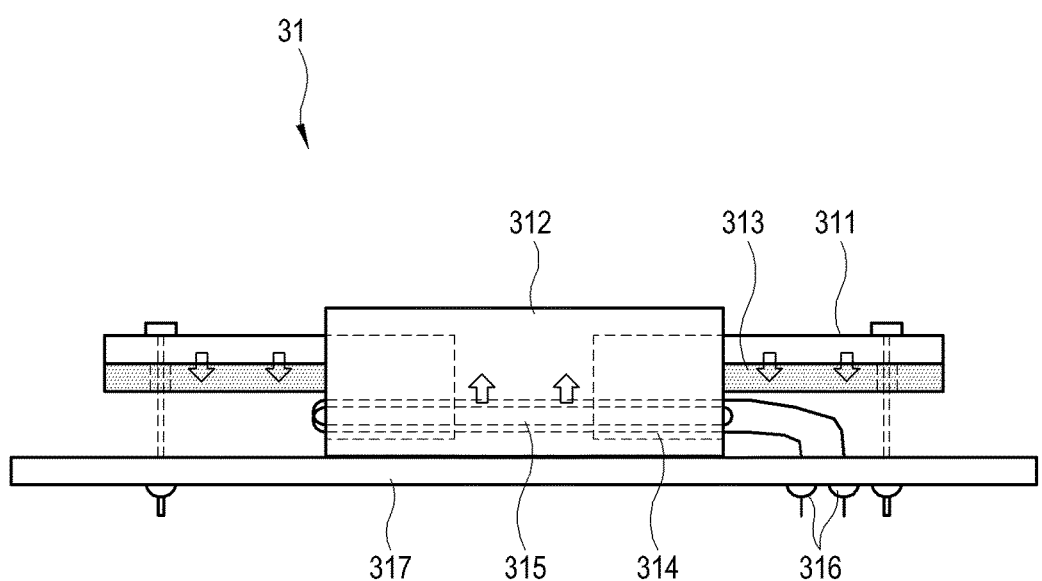
FIG. 31 illustrates another example electromagnetic induction device.

FIG. 31 illustrates an example electromagnetic induction device according to another example embodiment. Regarding an electromagnetic induction device 31 illustrated in FIG. 31, repetitive descriptions about the same or similar elements to those of the electromagnetic induction devices 1, 5, 6, 7, 11 and 83 illustrated in FIGS. 1 to 30 will be avoided as necessary. In this example embodiment, the electromagnetic induction device 31 may include a substrate layer 311, a core 312, a heat dissipation layer 313 and a coil portion 314.

The substrate layer 311 may include a thin-film coil pattern, which is formed on at least one between both surfaces of the substrate and through which an electric current of an input signal flows, and an opening provided at an inner area of the thin-film coil pattern. The thin-film coil pattern is provided to surround the periphery of the opening spirally by predetermined turns.

The core 312 is shaped corresponding to a circulation path of magnetic flux generated by change in the electric current flowing in the thin-film coil pattern of the substrate layer 311, and is arranged to penetrate the inner area of the thin-film coil pattern through the opening of the substrate layer.

The heat dissipation layer 313 dissipates heat transferred from at least one of the substrate layer 311 and the core 312. The heat dissipation layer 313 has a flat-plate shape like the substrate layer 311 and is arranged beneath the substrate layer 311.

The coil portion 314 is achieved by a wire having a predetermined diameter and wound on a portion 315, which does not overlap with a portion covered with the thin-film coil pattern of the substrate layer 311, within a center portion of the core 312. The heat dissipation layer 313 may thermally contact the coil portion 314, and dissipates heat generated in the coil portion 314, thereby effectively lowering the temperature of the electromagnetic induction device 31. The wire of the coil portion 314 may be sheathed with at least one insulation layer for electric insulation from the heat dissipation layer 313.

For example, the electromagnetic induction device 31 according to this example embodiment may be achieved by a transformer. In this case, one between the thin-film coil pattern and the coil portion 314 of the substrate layer 311 corresponds to a primary coil, and the other one corresponds to a secondary coil. Both ends 316 of the coil portion 314 are electrically connected and fastened to a base substrate 317.

In the electromagnetic induction device 31 according to this example embodiment, the thin-film coil pattern of the substrate layer 311 is used to maximize its turn number, and the coil portion 314 more inexpensive than the thin-film coil pattern is used to reduce costs.

Figure 32:
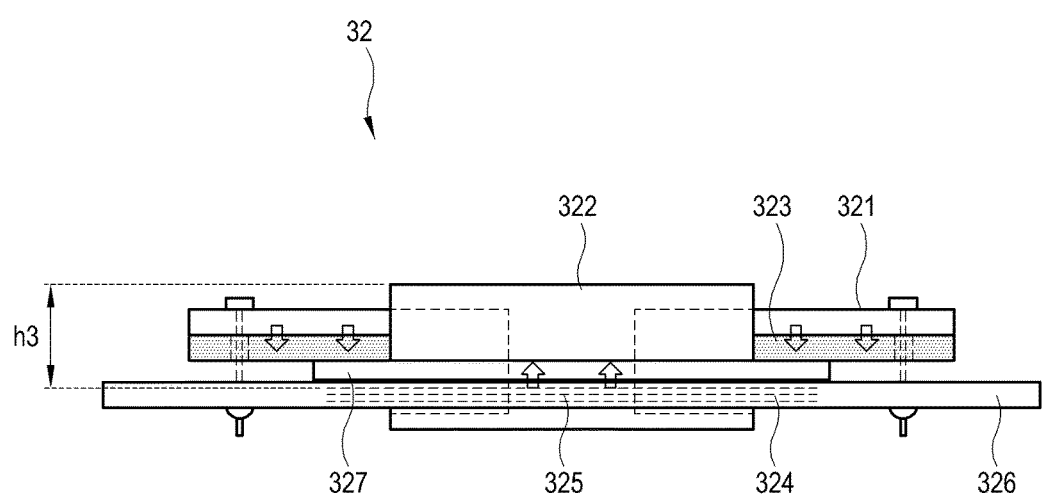
FIG. 32 illustrates yet another example electromagnetic induction device.

FIG. 32 illustrates an example electromagnetic induction device according to still another example embodiment. Regarding an electromagnetic induction device 32 illustrated in FIG. 32, repetitive descriptions about the same or similar elements to those of the electromagnetic induction devices 1, 5, 6, 7, 11, 31 and 83 shown in FIGS. 1 to 31 will be avoided as necessary. In this example embodiment, the electromagnetic induction device 32 may include a substrate layer 321, a core 322, a heat dissipation layer 323 and a thin-film coil pattern portion 324.

The substrate layer 321 may include a first thin-film coil pattern, which is formed on at least one between both surfaces of the substrate and through which an electric current of an input signal flows, and an opening provided at an inner area of the first thin-film coil pattern. The first thin-film coil pattern is provided to surround the periphery of the opening spirally by predetermined turns.

The core 322 is shaped corresponding to a circulation path of magnetic flux generated by change in the electric current flowing in the first thin-film coil pattern of the substrate layer 321, and is arranged to penetrate the inner area of the first thin-film coil pattern through the opening of the substrate layer 321.

The heat dissipation layer 323 dissipates heat transferred from at least one of the substrate layer 321 and the core 322. The heat dissipation layer 323 has a flat-plate shape like the substrate layer 321, and is arranged beneath the substrate layer 321.

The thin-film coil pattern portion 324 may include a second thin-film coil pattern, which is formed on at least one between both surfaces of at least one of layers that constitute the base substrate 316 and through which an electric current induced by the first thin-film coil pattern of the substrate layer 321 flows; and an opening, which is provided at an inner area of the second thin-film coil pattern and which is penetrated by a portion 325 that does not overlap with a portion penetrating the opening of the substrate layer 321 within a center portion of the core 322. In addition, at least one circuit device for outputting a signal to the electromagnetic induction device 32 or receiving a signal from the electromagnetic induction device 32 may be provided in an area, which is different from the area where the thin-film coil pattern portion 324 of the base substrate 316 is formed.

The heat dissipation layer 323 thermally contacts the thin-film coil pattern portion 324 and dissipates heat generated by the thin-film coil pattern portion 324, thereby effectively lowering the temperature of the electromagnetic induction device 32. The heat dissipation layer 323 dissipates heat from not only the thin-film coil pattern portion 324 but also the base substrate 316 provided with the thin-film coil pattern portion 324, thereby lowering the temperature of the base substrate 316. The electromagnetic induction device 32 may additionally include at least one insulation layer 327 for electric insulation between the thin-film coil pattern portion 324 and the heat dissipation layer 323.

For example, the electromagnetic induction device 32 according to this example embodiment may be achieved by a transformer. In this case, one between the first thin-film coil pattern of the substrate layer 321 and the second thin-film coil pattern of the thin-film coil pattern portion 324 corresponds to a primary coil, and the other one corresponds to a secondary coil.

In the electromagnetic induction device 32 according to this example embodiment, a part of the electromagnetic induction device 32 is arranged to penetrate the base substrate 326, thereby having an effect on minimizing the height h3 of the electromagnetic induction device 32 from the top of the base substrate 326.

Figure 33:
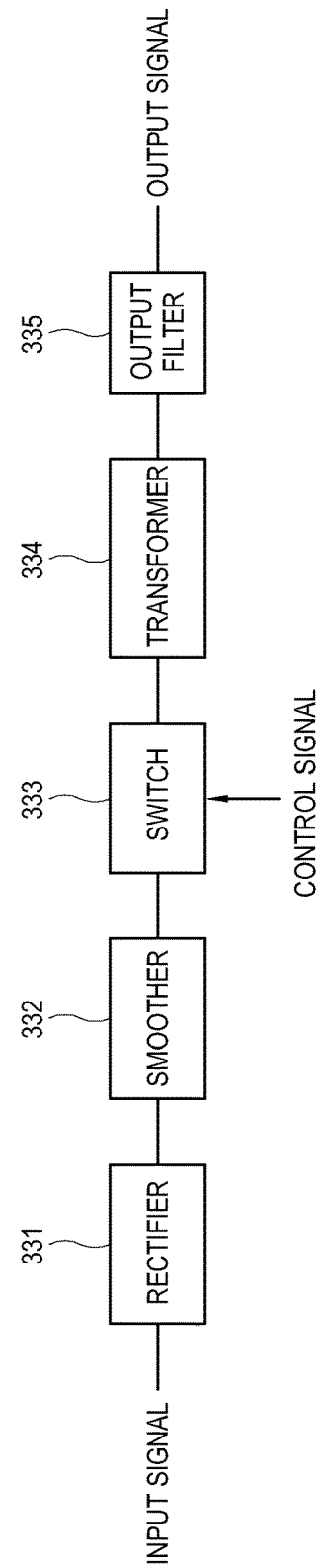
FIG. 33 is a block diagram illustrating an example power supply apparatus.

FIG. 33 is a block diagram illustrating an example power supply apparatus according to an example embodiment. As illustrated in FIG. 33, a power supply apparatus 33 may include a rectifier 331, a smoother 332, a switch 333, a transformer 334 and an output filter 335. The rectifier 331 illustrated in FIG. 33 receives an alternating current (AC) input signal and rectifies the input signal. The rectifier 331 may include, for example, a bridge diode.

The smoother 332 may include a capacitor having predetermined capacitance and smooths the rectified signal. The switch 333 allows an electric current of the signal output from the smoother 332 to intermittently flow toward a primary coil of the transformer 334 in accordance with an input control signal. The switch 333 may include a metal oxide semiconductor field effect transistor (MOSFET). The control signal input to the switch 333 may include a signal for controlling a level of a signal output in a pulse width modulation (PWM) mode.

The transformer 334 may for example include a primary coil in which an electric current of a signal output from the smoother 332 intermittently flows, a secondary coil in which an electric current induced by the primary coil flows, a core, and a heat dissipation layer. The transformer 334 may include the elements of the electromagnetic induction device 1, 5, 6, 7, 11, 31, 32 or 83 described with reference to FIGS. 1 to 32. The output filter 335 includes a diode and a capacitor, and filters the signal output from the transformer 334. The power supply apparatus 33 uses the transformer 334 to supply power having levels respectively adapted for elements of an electronic apparatus.

Figure 34:
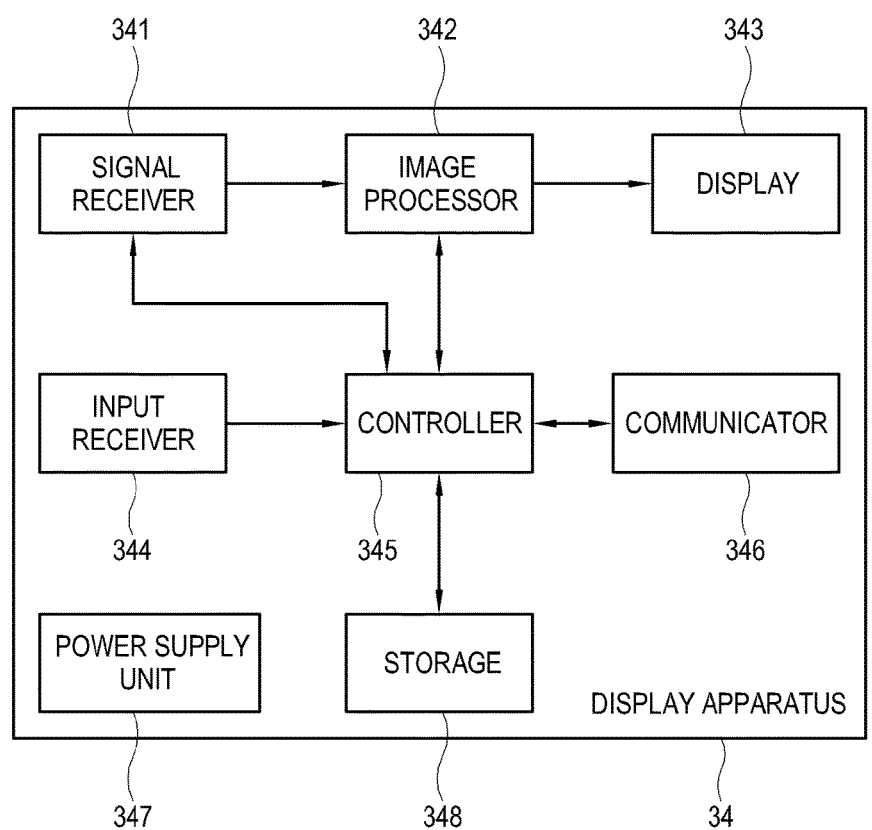
FIG. 34 is a block diagram illustrating an example display apparatus.

FIG. 34 is a block diagram illustrating an example display apparatus according to an example embodiment. A display apparatus 34 illustrated in FIG. 34 is an example of the electronic apparatus according to an example embodiment. The display apparatus 34 may include a signal receiver 341, an image processor 342, a display 343, an input receiver 344, a controller 345, a communicator 346, a power supply unit 347, and a storage 348. However, the elements of the display apparatus 34 shown in FIG. 34 are illustrated as an example embodiment, and may vary as necessary. Although it is not shown, at least one element may be excluded from the elements of the display apparatus 34 shown in FIG. 34, or a new element may be added.

The signal receiver 341 receives an image signal. The signal receiver 341 includes a tuner to receive an image signal such as a broadcast signal. The tuner may be tuned to a channel selected among a plurality of channels under control of the controller 345, thereby receiving an image signal of the tuned channel. The channel may be selected by a user. The input receiver 344 may receive a user's input. The input receiver 344 receives a user's input about the channel selection and transmits it to the controller 345. The input receiver 344 includes a control panel to receive a user's input, and includes a remote control signal receiver to receive a remote control signal from a remote controller. Alternatively, the input receiver 344 may include an audio receiver such as a microphone to receive a user input of voice, or a video receiver such as a camera to receive a user input of gestures and the like taken as an image.

Alternatively, the signal receiver 341 may receive an image signal from an imaging device such as a set-top box, a digital versatile disk, a personal computer (PC), etc.; an image signal from a peripheral device such as a smart phone, etc.; and an image signal from a server through Internet or the like network.

The image processor 342 processes the received image signal to be displayed as an image on the display 343. The image processor 342 may perform image processing such as modulation, demodulation, multiplexing, demultiplexing, analog-digital conversion, digital-analog conversion, decoding, encoding, image enhancement, scaling, etc. with regard to the received image signal.

The display 343 displays an image based on the image signal processed by the image processor 342. The display 343 may display an image by various types such as a liquid crystal display (LCD), a plasma display panel (PDP), an organic light emitting diode (OLED), etc.

The controller 345 controls the signal receiver 341 and the image processor 342 to display an image based on an input image signal in response to a user input received through the input receiver 344. The controller 345 may include a control program for performing such control, a nonvolatile memory and a volatile memory for entirely or partially performing the control program, and a microprocessor for performing the control program.

The communicator 346 includes communication circuitry that communicates with the external apparatus through a wired or wireless network, and exchanges information and/or data needed for operating the display apparatus 34 with the external apparatus. The storage 348 may be achieved by a flash memory, a hard disk drive or the like nonvolatile memory, and stores the programs, information and data required for operating the display apparatus 34.

The power supply unit 347 supplies power to operate the signal receiver 341, the image processor 342, the display 343, the input receiver 344, the controller 345, the communicator 346, the power supply unit 347 and the storage 348. According to an example embodiment, the power supply unit 347 may include the elements of the power supply apparatus described with reference to FIGS. 1 to 33.

As described above, there are provided the electromagnetic induction device according to an example embodiment, and the power supply apparatus and the display apparatus having the same, in which a problem of heat dissipation is addressed while keeping a thin flat-plate structure.

Although various example embodiments have been illustrated and described, it will be appreciated by those skilled in the art that changes may be made in these example embodiments without departing from the principles and spirit of the disclosure. Therefore, the foregoing has to be considered as illustrative only. The scope of the disclosure is defined in the appended claims and their equivalents. Accordingly, all suitable modification and equivalents may fall within the scope of the disclosure.

What is claimed is:

1. An apparatus, including an electromagnetic induction device, comprising:
   a substrate layer comprising at least one substrate configured to be laid one upon another and a first thin-film coil pattern disposed on at least one of both surfaces of the substrate and through which an electric current of a signal flows, the at least one substrate having an opening provided at an inner area of the first thin-film coil pattern;
   a core configured to have a shape corresponding to a circulation path of magnetic flux generated by change in an electric current flowing in the first thin-film coil pattern, and arranged to penetrate the inner area of the first thin-film coil pattern through the opening of the substrate layer;
   a heat dissipation layer disposed on one surface of at least one substrate of the substrate layer, said heat dissipation layer configured to dissipate heat from at least one of the substrate layer and the core;
   a base substrate comprising a second thin-film coil pattern, to which the electromagnetic induction device is mounted; and
   at least one insulation layer provided for electronic insulation between the second thin-film coil pattern and the heat dissipation layer,
   wherein a part of the electromagnetic induction device penetrates the base substrate, and the heat dissipation layer is further configured to dissipate heat from the base substrate.

2. The apparatus according to claim 1, wherein the heat dissipation layer has a greater thermal conductivity than the substrate layer.

3. The apparatus according to claim 2, wherein the heat dissipation layer comprises a metallic material.

4. The apparatus according to claim 1, wherein the heat dissipation layer has a flat-plate shape and is arranged in parallel with the substrate layer.

5. The apparatus according to claim 1, wherein the heat dissipation layer is in thermal contact with the substrate layer.

6. The apparatus according to claim 1, wherein the substrate layer and the heat dissipation layer are formed as a single printed circuit board.

7. The apparatus according to claim 1, wherein the thin-film coil pattern comprises a first thin-film coil pattern, and a second thin-film coil pattern through which an electric current induced by change in an electric current flowing in the first thin-film coil pattern flows.

8. The apparatus according to claim 1, further comprising a secondary coil wound on the core, wherein an electric current induced by change in an electric current flowing in the thin-film coil pattern flows in the secondary coil.

9. The apparatus according to claim 1, wherein at least one circuit device for outputting or receiving the signal is provided in a first area of the device, the first area being different from a second area of the device where the thin-film coil pattern is provided.

10. The apparatus according to claim 1, wherein the substrate layer comprises
    a first substrate formed with a first thin-film coil pattern; and
    a second substrate formed with a second thin-film coil pattern in a first area, and comprising at least one circuit device for outputting or receiving the signal in a second area different from the first area.

11. The apparatus according to claim 10, wherein the heat dissipation layer is interposed in between the first substrate and the second substrate.

12. A power supply apparatus for supplying power to an electronic apparatus, the power supply apparatus comprising:
    at least one circuit device; and
    an electromagnetic induction device electrically connected to the at least one circuit device,
    the electromagnetic induction device comprising:
    a substrate layer comprising at least one substrate that is configured to be laid one upon another and a first thin-film coil pattern disposed on at least one of both surfaces of the substrate and through which an electric current of a signal flows, the at least one substrate having an opening provided at an inner area of the first thin-film coil pattern;
    a core configured to have a shape corresponding to a circulation path of magnetic flux generated by change in an electric current flowing in the first thin-film coil pattern, and arranged to penetrate the inner area of the first thin-film coil pattern through the opening of the substrate layer; and
    a heat dissipation layer disposed on at least one surface of the substrate, the heat dissipation layer configured to dissipate heat from at least one of the substrate layer and the core;
    a base substrate comprising a second think-film coil pattern, to which the electromagnetic induction device is mounted; and
    at least one insulation layer provided for electronic insulation between the second thin-film coil pattern and the heat dissipation layer,
    wherein a part of the electromagnetic induction device penetrates the base substrate, and the heat dissipation layer is further configured to dissipate heat from the base substrate.

13. The power supply apparatus according to claim 12, wherein the heat dissipation layer comprises a metallic material.

14. The power supply apparatus according to claim 12, wherein the heat dissipation layer is in thermal contact with the substrate layer.

15. The power supply apparatus according to claim 12, wherein the substrate layer and the heat dissipation layer are formed as a single printed circuit board.

16. The power supply apparatus according to claim 12, wherein the thin-film coil pattern comprises a first thin-film coil pattern, and a second thin-film coil pattern through which an electric current induced by change in an electric current flowing in the first thin-film coil pattern flows.

17. The power supply apparatus according to claim 12, further comprising a secondary coil wound on the core, wherein an electric current induced by change in an electric current flowing in the thin-film coil pattern flows in the secondary coil.

18. The power supply apparatus according to claim 12, wherein the substrate layer comprises a first substrate formed with a first thin-film coil pattern; and a second substrate formed with a second thin-film coil pattern in a first area, and comprising at least one circuit device for outputting or receiving the signal in a second area different from the first area.

19. The power supply apparatus according to claim 12, wherein the heat dissipation layer is interposed in between the first substrate and the second substrate.

20. A display apparatus comprising:

a signal receiver configured to receive an image signal;

a display configured to display an image based on the image signal; and a power supply configured to supply power to the display and comprising at least one circuit device and an electromagnetic induction device electrically connected to the at least one circuit device, the electromagnetic induction device comprising:

a substrate layer comprising at least one substrate configured to be laid one upon another and a first thin-film coil pattern disposed on at least one of both surfaces of the substrate and through which an electric current of a signal flows, the at least one substrate having an opening provided at an inner area of the first thin-film coil pattern;

a core configured to have a shape corresponding to a circulation path of magnetic flux generated by change in an electric current flowing in the first thin-film coil pattern, and arranged to penetrate the inner area of the first thin-film coil pattern through the opening of the substrate layer;

a heat dissipation layer disposed on at least one surface of the substrate, the heat dissipation layer configured to dissipate heat from at least one of the substrate layer and the core; and a base substrate comprising a second thin-film coil pattern, to which the electromagnetic induction device is mounted, at least one insulation layer provided for electronic insulation between the second thin-film coil pattern and the heat dissipation layer, wherein a part of the electromagnetic induction device penetrates the base substrate, and the heat dissipation layer is further configured to dissipate heat from the base substrate.

* * * * *